(12) United States Patent
Neumann et al.

(10) Patent No.: US 7,369,700 B2
(45) Date of Patent: May 6, 2008

(54) IDENTIFIER COMPARISON

(75) Inventors: Cedric Neumann, Birmingham (GB); Roberto Puch-Solis, Birmingham (GB)

(73) Assignee: The Secretary of State for the Home Department, Birmingham (GB)

( * ) Notice: Subject to any disclaimer, the term of this patent is extended or adjusted under 35 U.S.C. 154(b) by 559 days.

(21) Appl. No.: 11/083,579

(22) Filed: Mar. 18, 2005

(65) Prior Publication Data

US 2006/0083430 A1    Apr. 20, 2006

(30) Foreign Application Priority Data

Oct. 14, 2004   (GB)   ................... 0422784.9
Feb. 11, 2005   (GB)   ................... 0502900.4

(51) Int. Cl.
    *G06K 9/00*    (2006.01)
(52) U.S. Cl. ................. 382/181; 382/124; 382/125
(58) Field of Classification Search ............. 382/181, 382/190, 124, 125
    See application file for complete search history.

(56) References Cited

U.S. PATENT DOCUMENTS

| 6,487,662 | B1 | 11/2002 | Kharon et al. |
| 6,498,861 | B1 * | 12/2002 | Hamid et al. ............... 382/124 |
| 2003/0063782 | A1 | 4/2003 | Acharya et al. |
| 2004/0202355 | A1 | 10/2004 | Hillhouse |

FOREIGN PATENT DOCUMENTS

| EP | 0 636 996 A2 | 2/1995 |
| EP | 0 848 346 A2 | 6/1998 |
| FR | 2 848 699 A1 | 6/2004 |
| WO | 02/097712 A2 | 12/2002 |
| WO | 03/085591 A1 | 10/2003 |

OTHER PUBLICATIONS

Maltoni, D. et al. "Handbook of Fingerprint Recognition," Springer Verlag, Jun. 2003, XP002366505 & XP002365424, ISBN: 0-387-95431-7.
Ross, A. et al. "Estimating Fingerprint Deformation," Proceedings of the International Conference on Biometric Authentication, 3072:249-255, Jul. 2004.
Ross, A. et al. "A deformable model for fingerprint matching," The Journal of Pattern Recognition Society, 38:95-103, 2005.

(Continued)

*Primary Examiner*—Matthew C. Bella
*Assistant Examiner*—Mike Rahmjoo
(74) *Attorney, Agent, or Firm*—Merchant & Gould P.C.

(57) ABSTRACT

A method of comparing a first representation of an identifier with a second representation of an identifier is provided. The method includes providing an expression of the first representation, such as a fingerprint, and considering the expression of the first representation against a probability distribution based on the variation in the expression between different example representations of the second representations, to provide a first consideration. The method also provided for considering the expression of the first representations against a probability distribution based on the variation in the expression between different population representations, to provide a second consideration. By using the first consideration and second consideration together it is possible to provide a measure of comparison between the first representation and the second representation.

19 Claims, 8 Drawing Sheets

OTHER PUBLICATIONS

Bazen, A. et al. "Thin-Plate Spline Modelling of Elastic Deformations in Fingerprints," Proc. 3rd IEEE Benelux Signal Processing Symposium, S02-1-S02-4, Mar. 2002.

Ross, A. "Information Fusion in Fingerprint Authentication," Michigan State University, Department of Computer Science & Engineering, 2003.

Duda, R. et al. "Pattern Classification, Introduction," Wiley-Interscience, 1-19, 2001, XP002365512, ISBN: 0-471-05669-3.

Duda, R. et al. "Pattern Classification, Bayesian Decision Theory," Wiley-Interscience, 20-83, 2001, XP002365513, ISBN: 0-471-05669-3.

* cited by examiner

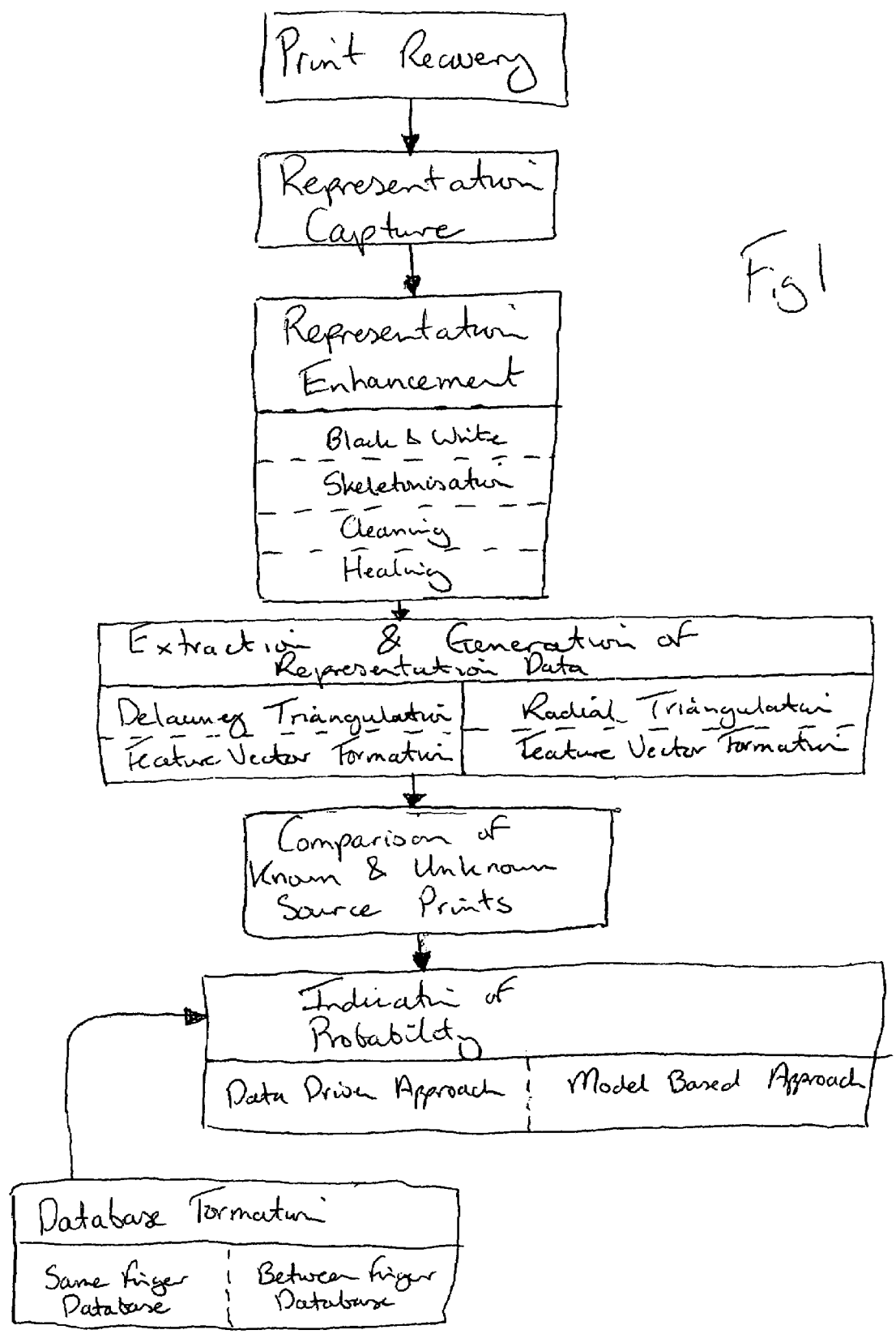

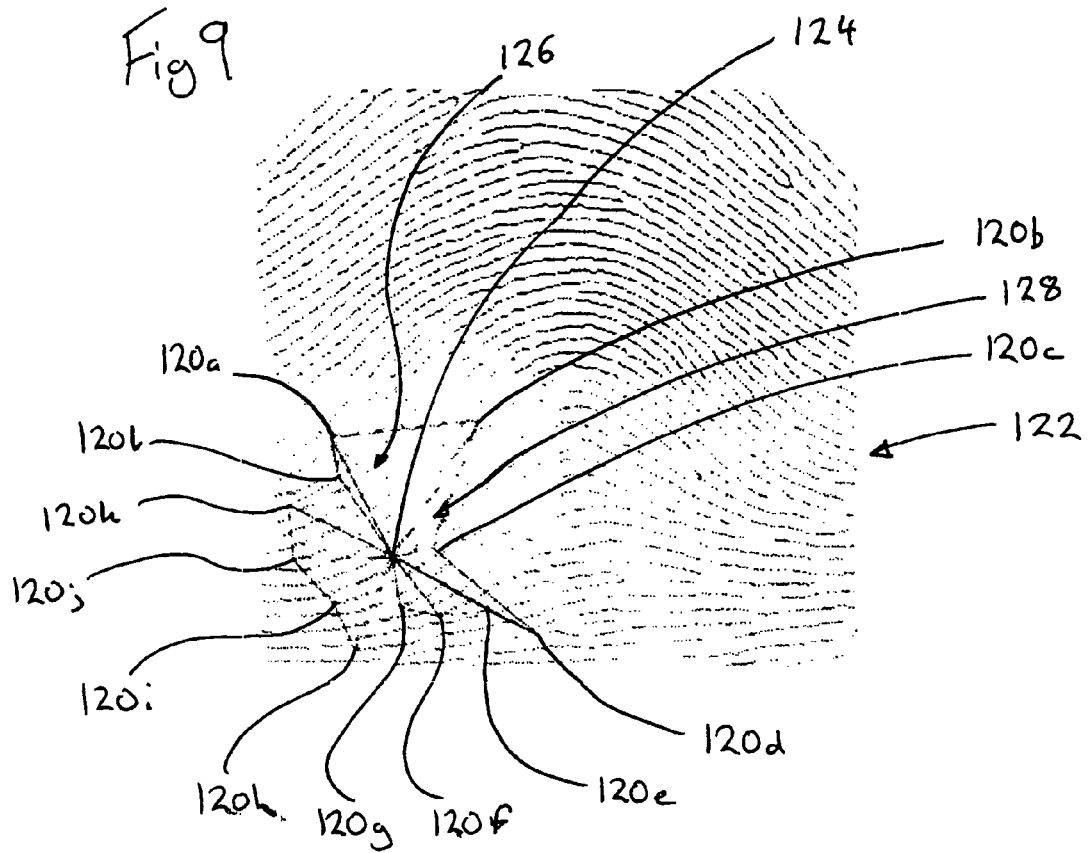
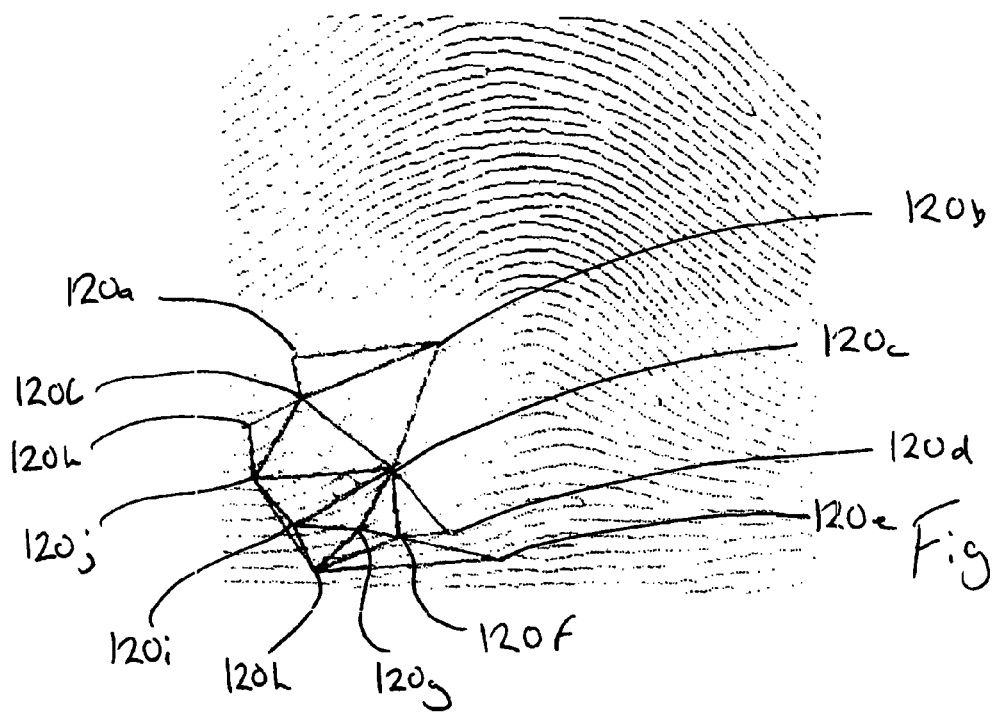

An example of an acyclic directed graph of a Bayesian network

IDENTIFIER COMPARISON

This invention concerns improvements in and relating to identifier comparison, particularly, but not exclusively, in relation to the comparison of biometric identifiers or markers, such as prints from a known source with biometric identifiers or markers, such as prints from and unknown source. The invention is applicable to fingerprints, palm prints and a wide variety of other prints or marks, including retina images.

It is useful to be able to capture, process and compare identifiers with a view to obtaining useful information as a result. In the context of fingerprints, the useful result may be evidence to support a person having been at a crime scene.

Problems exist with present methods in terms of their accuracy and/or speed and/or the range of effects that can be taken into account.

The present invention has amongst its potential aims to provide a method of comparison which is more versatile.

According to a first aspect of the invention we provide a method of comparing a first representation of an identifier with a second representation of an identifier, the method including:

providing an expression of the first representation;

considering the expression of the first representation against a probability distribution based on the variation in the expression between different example representations of the second representations, to provide a first consideration;

considering the expression of the first representations against a probability distribution based on the variation in the expression between different population representations, to provide a second consideration;

using the first consideration and second consideration to provide a measure of comparison between the first representation and the second representation.

The first aspect of the invention may include any of the features, options or possibilities set out elsewhere in this application, including those of the second and/or third aspects of the invention.

Particularly in the context of a first form of the invention, which may particularly reflect the form detailed in the second aspect of the invention below, the following features, options and possibilities may be provided.

The expressions of the first and second representations may be in the form of a distance. The distance may be obtained by considering data from the first representation against data from the second representation. Preferably the data from the first representation and/or the data from the second representation is in the form of a vector. Preferably a distance between a first representation vector and a second representation vector is obtained. The vector(s) may be of the form provided below and/or detailed in applicant's UK patent application number 0502902.0 of 11 Feb. 2005 and/or UK patent application number 0422785.6 of 14 Oct. 2004 and the contents of that application are incorporated herein by reference. Preferably the distance between the expression of the first representation and the expression of the second representation is considered against a probability distribution based on the variation in the distances between expressions between different example representations of the second representation to provide the first consideration is expressed in this way. Preferably the distance between the expression of the first representation and the expression of the second representation is considered against a probability distribution on distances based on the variation in the expression between different population representations to provide the second consideration is provided in this way.

The different example representations of the second representation may be provided from the same identifier as the second representation of an identifier being compared with the first representation of an identifier. In particular, the example representations of the second representation may come from an individual, with the second representation which is being considered against the first coming from the same individual. The individual may be a suspect and in particular the suspected source of the first representation. In an alternative form, the different example representations of the second representation may be provided from a different identifier to the identifier of the second representation of an identifier being compared with the first representation of an identifier. In particular, the example representations of the second representation may come from an individual, with the second representation which is being considered against the first coming from a different individual. The different individual may be a suspect and in particular the suspected source of the first representation. The example representations of the second representation may come from individual who is not a suspect.

A plurality of example representations of the second representation may be provided. An expression for one or more pairs of example representations may be provided. The expression(s) may be in the form of a distance. The distance may be obtained by considering data from a first example representation of the second representation against data from a second example representation of the second representation. Preferably the data from the first and/or second example representations of the second representation are in the form of a vector. The vector(s) may be of the form provided below and/or detailed in applicant's UK patent application number 0502902.0 of 11 Feb. 2005 and/or UK patent application number 0422785.6 of 14 Oct. 2004 and the contents of that application are incorporated herein by reference.

Preferably a probability distribution based on the expressions of the plurality of example representations, particularly based on the cross-distances between the expressions of the plurality of example representations, may be provided. The method may include considering the expression of the first representation against the probability distribution for the example representations, and particularly may include considering the distance between the expression of the first representation and the expression of the second representation against a probability distribution for distances of the example representations, to provide the first consideration.

The different representations of the population representation may be provided from different individuals and/or different identifiers, such as fingerprints, thereof.

A plurality of example representations of the second representation may be provided. An expression for one or more pairs of example representations may be provided. The expression(s) may be in the form of a distance. The distance may be obtained by considering data from a first example representation of the second representation against data from a second example representation of the second representation. Preferably the data from the first and/or second example representations of the second representation are in the form of a vector. The vector(s) may be of the form provided below and/or detailed in applicant's UK patent application number 0502902.0 of 11 Feb. 2005 and/or UK patent application number 0422785.6 of 14 Oct. 2004 and the contents of that application are incorporated herein by reference.

Preferably a plurality of population representations from different origins, for instance different persons and/or different fingers are provided. Preferably an expression of each of the plurality of population representations is provided. Preferably a probability distribution based on the expressions of the plurality of population representations, particularly based on the distances between the expression of the first representation and the expressions of the plurality of population representations, is provided. The method may include considering the expression of the first representation against the probability distribution for the population examples, and particularly may include considering the distance between the expression of the first representation and the expression of the second representation against the probability distribution on distances between the expression of the second representation and the population examples, to provide a second consideration.

The measure of comparison between the first representation and the second representation may be a likelihood ratio. The likelihood ratio may be the quotient of two probabilities, particularly the numerator being the probability the two representations considering the hypothesis that the vectors originate from two representations of the same identifier, particularly the denominator being the probability of the two representations considering the hypothesis that the vectors originate from representations of different identifiers.

Particularly in the context of a second form of the invention, which may reflect the form of the third aspect of the invention below, the following features, options and possibilities may be provided. The method may include providing a Bayesian network which represents the variation in an expression for a plurality of example representations of the second representation. The method may include providing a probability distribution from the Bayesian network for the example representations. The method may include considering the expression of the first representation against the probability distribution for the example representations, to provide a first consideration. The method may include providing a Bayesian network which represents the variation in an expression for a plurality of population representations. The method may include providing a probability distribution from the Bayesian network for the population representations. The method may include considering the expression of the first representation against the probability distribution for the population examples, to provide a second consideration. The probability distribution for the differences between a plurality of representations of the identifier from a common source may be obtained by the probability distribution being generating from a Bayesian network. The probability distribution for the differences between a plurality of representations of the identifier from different sources may be obtained by the probability distribution being generated from a Bayesian network.

According to a second aspect of the invention we provide a method of comparing a first representation of an identifier with a second representation of an identifier, the method including:

providing an expression of the first representation;

providing an expression of the second representation;

providing a plurality of example representations of the second representation;

providing an expression of each of the plurality of example representations;

providing a probability distribution based on the expressions of the plurality of example representations of the second representations;

considering the expression of the first representation against the probability distribution for the example representations, to provide a first consideration;

providing a plurality of population representations from different origins;

providing an expression of each of the plurality of population representations;

providing a probability distribution based on the expressions of the plurality of population representations;

considering the expression of the second representation against the probability distribution for the population examples, to provide a second consideration;

using the first consideration and second consideration to provide a measure of comparison between the first representation and the second representation.

Preferably the considering of the expression of the first representation against the probability distribution for the example representations, to provide a first consideration, includes considering the expression of the first representation and the expression of the second representation. Preferably the consideration is of the distance between the expression of the first representation and the expression of the second representation.

Preferably the considering of the expression of the expression of the second representation against the probability distribution for the population examples, to provide a second consideration, includes considering the expression of the second representation and the expression of the first representation. Preferably the consideration is of the distance between the expression of the second representation and the expression of the first representation.

The second aspect of the invention may include any of the features, options or possibilities set out elsewhere in this application, including those of the first and/or third aspects of the invention. The second aspect of the invention may particularly include features, options or possibilities from amongst the following.

In particular, the second aspect and/or other aspects of the invention may provide, that the probability distribution based on the expressions of the plurality of the example representations are based on the differences or cross-differences between the expressions. Preferably the difference between the expression of the first representation and the expression of the second representation against the probability distribution is considered to provide the first consideration. Ideally, the differences or cross-differences of expressions of the plurality of example representations of the second representations are so considered. Preferably the probability distribution based on the expressions of the plurality of population representations is based upon the differences in the expression of the first representation and the expressions of the plurality of population representations. Preferably the consideration of the expression of the first representation against the probability distribution for the population examples to provide a second consideration involves considering the difference of the expressions of the first and second representations against the probability distribution for the population examples.

According to a third aspect of the invention we provide a method of comparing a first representation of an identifier with a second representation of an identifier, the method including:

providing an expression of the first representation;

providing a Bayesian network which represents the variation in an expression for a plurality of example representations of the second representation;

providing a probability distribution from the Bayesian network for the example representations;

considering the expression of the first representation against the probability distribution for the example representations, to provide a first consideration;

providing an expression of the first representation;

providing a Bayesian network which represents the variation in an expression for a plurality of population representations;

providing a probability distribution from the Bayesian network for the population representations;

considering the expression of the first representation against the probability distribution for the population examples, to provide a second consideration;

using the first consideration and second consideration to provide a measure of comparison between the first representation and the second representation.

The third aspect of the invention may include any of the features, options or possibilities set out elsewhere in this application, including those of the first and/or second aspects of the invention. The third aspect of the invention may particularly include features, options or possibilities from amongst the following.

The first aspect and/or second aspect and/or third aspect may include features, options or possibilities from amongst the following.

The first and/or second representation of the identifier may have been captured. The capture may have occurred from a crime scene and/or an item and/or a location and/or a person. The capture may have occurred by scanning and/or photography. The first and/or second representations of the identifier may be captured in the same or a different way to the other.

The first and/or second representation may have already been processed compared with the captured representation. The processing may have involved converting a colour and/or shaded representation into a black and white representation. The processing may have involved the representation being processed using Gabor filters. The processing may have involved altering the format of the representation. The alteration in format may involve converting the representation into a skeletonised format. The alteration in format may involve converting the representation into a format in which the representation is formed of components, preferably linked data element sets. The alteration may convert the representation into a representation formed of single pixel wide lines. The processing may have involved cleaning the representation, particularly according to one or more of the techniques provided in applicant's UK patent application number 0502893.1 of 11 Feb. 2005 and/or UK patent application number 0422785.6 of 14 Oct. 2004. The processing may have involved healing the representation, particularly according to one or more of the techniques provided in applicant's UK patent application number 0502893.1 of 11 Feb. 2005 and/or UK patent application number 0422785.6 of 14 Oct. 2004. The processing may have involved cleaning of the representation followed by healing of the representation. The processed representation may be subjected to one or more further steps. The one or more further steps may include the extraction of data from the processed representation, particularly as set out in detail in applicant's UK patent application number 0502990.5 of 11 Feb. 2005.

The identifier may be a biometric identifier or other form of marking. The identifier may be a fingerprint, palm print, ear print, retina image or a part of any of these. The first and/or second representation may be a full or partial representation of the identifier. The first representation may be from the same or a different source as the second representation.

The expression of the first and/or second representation and/or example representations and/or population representations may be in the form of a vector, for instance a feature vector. The expression of the first and/or second representation expression and/or example representations and/or population representations may involve selecting a plurality of features in a representation of an identifier and linking each feature to one or more of the other features and/or a center therefore. The expression of the first and/or second representation and/or example representations and/or population representations may particularly be provided according to the features, options and possibilities set out in applicant's UK patent application number 0502893.1 of 11 Feb. 2005 and/or UK patent application number 0422785.6 of 14 Oct. 2004 and the contents of that application are incorporated herein by reference.

In particular the step of providing the expression may involve one or more of the following options. The selecting of a plurality of features may involve selecting a feature and then selecting one or more further features. One or more of the features may be a ridge end. One or more of the features may be a bifurcation. One or more of the features may be another form of minutia.

The following options may particularly apply to one embodiment of the invention. The plurality of features preferably numbers three. Preferably one or more of the selected plurality of features are linked to at least two other selected features. More preferably two or more of the plurality of selected features are linked to at least two other selected features. Ideally all of the plurality of selected features are linked to at least two other selected features. Preferably one of the plurality of selected features is only linked to two of the other plurality of selected features. Preferably the linking of the plurality of selected features to each other by lines forms a triangle. One or more or all of the plurality of selected features may be linked to other features other than the selected features too. The link is preferably in the form of a line. The line is preferably a straight line. Preferably the features and links form triangles formed according to the Delaunay triangulation methodology.

The following options may particularly apply to a second embodiment of the invention. The plurality of features may number three or more. The plurality of features may number three to twenty, preferably three to sixteen and ideally three to twelve. Preferably one or more of the features are linked to at least one other feature and/or a center. More preferably two or more of the plurality of selected features are linked to at least another selected feature and to a common center. Ideally all of the plurality of selected features are linked to another of the selected features and to a common center. Preferably one of the plurality of features is only linked to one other feature and a centre. Preferably the linking of the selected features and center to each other is provided by lines. The lines may define a polygon, for instance a triangle or a quadrilateral. One or more or all of the plurality of selected features may be linked to other features other than the selected features too. The link is preferably in the form of a line. The line is preferably a straight line.

Particularly when provided according to one preferred embodiment of the invention, the expression of the first and/or second representation and/or example representations and/or population representations, particularly as a vector, may include information on the type of feature for one or more, preferably all, the selected features. The type may be the minutia forming the feature, such as ridge end and/or bifurcation and/or other. The expression may include information on the direction of the link for one or more, preferably all, of the links between the features. The information may be on the relative direction of the links. The expression may include information on the distances between one, and preferably all, pairs of the features. The direction of one or more of the links, preferably all, may be expressed relative to the orientation. The orientation may be about a fixed axis. More preferably the orientation is relative to the opposing segment of the triangle. Preferably the direction and/or orientation are expressed in terms independent of the representation. The direction may be expressed as a number, preferably within a range, most preferably within the range between 0 and $2\pi$ radians. The orientation may be expressed as a number, preferably within a range, most preferably within the range between 0 and $\pi$ radians.

Preferably the expression, ideally as a vector, includes three pieces of information on the feature types, three pieces of information on the relative direction of the links between the features and three pieces of information on the distances between the features. The vector preferably includes nine pieces of information.

Particularly when provided according to a second preferred embodiment of the invention, the expression of the first and/or second representation and/or example representations and/or population representations, particularly as a vector, may include information on the type of feature for one or more, preferably all, the selected features. The type may be the minutia forming the feature, such as ridge end and/or bifurcation and/or other. The expression may include information on the distance between a feature and at least one other feature. Preferably the expression includes information on the distance between a feature and one other feature and information on the distance between the feature and a second other feature, and ideally only on such distances between the feature and other features. The expression may include information on the radius between the center and one, preferably all, of the features. The expression may include information on the surface or surface area of one, preferably all, of the polygons defined by two of more features and the center. The expression may include information on the direction of the feature for one or more, preferably all, of the features, preferably with the direction being defined relative to the representation or image thereof. The direction of one or more of the features, preferably all, may be expressed relative to the orientation. The orientation may be about a fixed axis. The expression may include information on the region of the feature for one, preferably all, of the features. The expression may include information on the general pattern of the representation.

Preferably the expression, ideally as a vector, includes a piece of information on the feature type, a piece of information on the relative direction of the feature, a piece of information on the distances between the feature and another feature and the radius between the feature and the center for each selected feature.

The considering of the expression of the first representation against a probability distribution, preferably for different example representations of the second representation, may form the numerator in the use of the first consideration and second consideration. The considering of the expression may involve finding the frequency for that expression value in the probability distribution. The considering of expression of the first representation against the probability distribution may involve those information pieces that are continuous in nature.

The probability distribution based on the variation in the expression between different example representations may provide frequency of occurrence for different expression values. Preferably the probability distribution is obtained from physically taken example representations. The different example representations preferable all come from the same source as one another. The source may the same or different to that believed to be the source of the first representation.

The probability distribution based on the expressions of example representations may have the form set out in respect of the first and/or second and/or third aspects of the invention and/or in respect of any of the features, options or possibilities set out in the next two paragraphs.

In the second aspect in particular, the following features, options and possibilities may apply to the manner in which the probability distribution based on the expressions of the example representations is arrived at. The probability distribution may be estimated from a database of example representations of an identifier taken from the same source. The source may be the same as the first representation or may be different there from. The database may contain details of the distances between example representations and/or the comparison of different example representations using a vector to express each. The database preferably contains one or more example representations taken under different conditions. The different conditions may be one or more of, different pressures applied by the source when forming the representation example, such as the fingerprint; different substrates to which the source was applied when forming the example representation; different movements used by the source when the source was applied to form the example representation; different extents of distortion in the example representation compared with a perfect example representation; different levels of completeness of the example representation. The database may contain one or more sets of such details. Different sets may come from different sources, but ideally the details within a set come from the same source. Preferably the database is populated by the identification of corresponding features and links, ideally triangles and lines, in a series of representations taken from the same source. Alternatively, the database can be populated by processing a representation and/or an example representation so as to obtain an expression thereof and then or during that process applying distortion functions thereto. The distortion functions can then be calculated, for instance using thin plate splines. One or more sets of such details may be provided in this way. Other sets may be formed by applying the distortion functions to other representations and/or an example representation. In particular the technique of applicant's UK patent application number 0502849.3 of 11 Feb. 2005 and/or of UK patent application number 0423648.5 filed 26 Oct. 2004 may be used.

In the third aspect in particular, the following features, options and possibilities may apply to the manner in which the probability distribution based on the expressions of the example representations is arrived at. The probability distribution may be derived from one or more factor probability distributions. The probability distribution or the factor probability distribution may be obtained from a Bayesian network. The Bayesian network may be obtained and/or estimated by considering a plurality of example representations. Preferably the example representations are taken from the same source, such as the same finger. The plurality of example representations may be obtained from a database and/or may be sampled. Preferably the Bayesian network defines the quantities which are independent of one another and/or the quantities which are dependent upon one another and/or the quantities which are conditionally independent. Preferably information pieces that are discrete in nature and/or are continuous in nature are so considered. The Bayesian network may be obtained using one or more algorithms. The algorithm used may be the NPC algorithm for estimating acyclic directed graph of Steck H., Hofmann, R., and Tresp, V. (1999). "Concept for the PRONEL Learning Algorithm", Siemens A G, Munich and/or the EM-algorithm, S. L. Lauritzen (1995) "The EM algorithm for graphical association models with missing data". Computational Statistics & Data Analysis, 19:191-201. for estimating the conditional probability distributions. The contents of both documents, particularly in relation to the algorithms they describe are incorporated herein by reference.

The considering of the expression of the first representation against a probability distribution, preferably for different population representations, may form the denominator in the use of the first consideration and second consideration. The considering of the expression may involve finding the frequency for that expression value in the probability distribution.

The probability distribution based on the variation in the expression between different population representations may provide frequency of occurrence for different expression values. Preferably the probability distribution is obtained from physically taken population representations. The different population representations preferable all come from different source to one another. The different population representations may be collected specifically for use in the method. The different population representations may have been obtained for other purposes. The different population representations may be in an existing database.

The probability distribution based on the variation in the expression between different population representations may have the form set out in respect of the first and/or second and/or third aspects of the invention and/or in respect of any of the features, options or possibilities set out in the next two paragraphs.

In the second aspect in particular, the following features, options and possibilities may apply to the manner in which the probability distribution based on the expressions of the population examples are arrived at. The probability distribution may be derived from one or more factor probability distributions. The probability distribution and/or one of the factor probability distributions may be estimated from a database of population representations of an identifier from different sources. The database may contain details of the distances between population representations and/or the comparison of different population representations using a vector to express each. The database preferably contains a number of population representations that reflect the variation in representations for the identifier in the population or a subset thereof. The database could be generated from the capture and processing of a large number of population representations from different sources. Preferably in such a case, the database is populated by the identification of corresponding features and links, ideally as triangles and lines, in a series of representations taken from a variety of sources. As an alternative, the database could be formed by taking an existing database that includes population representations from different sources. Preferably the existing database has its data processed to provide the data in a compatible format for the method. The probability distribution and/or one of the factor probability distributions may be estimated from analysis of or from an existing probability distribution that details variation in one or more of the characteristics of the expression. The characteristics may particularly be one or more or all of those that are discrete in nature, for instance the general pattern. The probability distribution and/or one of the factor probability distributions may estimated from analysis of variation in one or more of the characteristics of the expression which are discrete in nature, other than general pattern. A probability tree is preferred for such a probability distribution or factor probability distribution.

In the third aspect in particular, the following features, options and possibilities may apply to the manner in which the probability distribution for the based on the expressions of the population examples is arrived at. The probability distribution may be derived from one or more factor probability distributions. The probability distribution and/or the factor probability distribution may be obtained from a Bayesian network estimated from a database of feature vectors extracted from different sources. The Bayesian network may be obtained and/or estimated by considering a plurality of population representations taken from the different sources, such as different fingers. The plurality of population representations may be obtained from a database and/or may be sampled. Preferably the Bayesian network defines the quantities that are independent of one another and/or the quantities which are dependent upon one another and/or the probabilities which are conditionally independent. Preferably information pieces that are discrete in nature and/or are continuous in nature are so considered. The Bayesian network may be obtained using one or more algorithms. The algorithm used may be the NPC algorithm for estimating acyclic directed graph of Steck H., Hofmann, R., and Tresp, V. (1999). "Concept for the PRONEL Learning Algorithm", Siemens A G, Munich and/or the EM-algorithm, S. L. Lauritzen (1995) "The EM algorithm for graphical association models with missing data". Computational Statistics & Data Analysis, 19:191-201. for estimating the conditional probability distributions. The contents of both documents, particularly in relation to the algorithms they describe are incorporated herein by reference.

The probability distribution based on the expressions of the example representations and/or the probability distribution based on the expressions of the population examples may be generated for a plurality of different numbers of selected features. The number of selected features may be three or more and particularly three to twelve. Preferably a probability distribution of each type is generated for each possible number of selected features used in the method. The probability distributions may be generated in advance of the number of selected features in the first representation and/or second representation being known. Particularly when the different example representations of the second representation are from a different identifier to the second representation of an identifier which is being compared with the first representation of an identifier, the probability distribution for the example representations may be generated in advance. The probability distribution for the example representations may be generated in advance, particularly in respect of a method provided according to the third aspect of the invention. The probability distribution for the population representations may be generated in advance, particularly in respect of a method provided according to the third aspect of the invention. Once generated, the probability distributions may be stored for future and/or repeated use. The probability distributions may be generated after the number of selected features in the first representation and/or second representation is known, ideally with only probability distributions for that number of selected features being generated. After use, the probability distributions may be discarded, particularly if the next use is concerned with a different number of selected features. The probability distributions may each be generated from a database of representations. The probability distributions may be generated by processing the representations in the databases using a particular number of selected features.

The database of the expressions of the example representations and/or the database of the expressions of the population examples may be provided for a plurality of different numbers of selected features. The number of selected features may be three or more and particularly three to twelve. Preferably a database of each type is provided for each possible number of selected features used in the method. The databases may be generated in advance of the number of selected features in the first representation and/or second representation being known. Once generated, the databases may be stored for future and/or repeated use. The databases may be generated after the number of selected features in the first representation and/or second representation is known, ideally with only databases for that number of selected features being generated. After use, the databases may be discarded, particularly if the next use is concerned with a different number of selected features. The databases may each be generated from a database of representations. The databases may be generated by processing the representations in the databases using a particular number of selected features.

The use of the first consideration and second consideration may be to evaluate a hypothesis. The hypothesis may include, particularly as the first consideration, that the first representation and the second representation are from the same source. In the first consideration, the expressions of the first and/or second representations may be assumed to have the same discrete pieces of information. The probability distribution may be based upon differences between expressions of the representations, particularly in terms of their continuous pieces of information. The hypothesis may include, particularly as the second consideration, that the first representation and the second representation are from different sources. In the second consideration, the expressions of the first and/or second representations may be assumed to have the same discrete pieces of information. The probability distribution may be based upon differences between expressions of the representations, particularly in terms of their continuous pieces of information.

The use of the first consideration and second consideration to evaluate a hypothesis, may be the evaluation of a first hypothesis, for instance a prosecution hypothesis, and a second hypothesis, for instance a defence hypothesis. The evaluation may be expressed as:

$$LR = \frac{Pr(fv_s, fv_m | H_p)}{Pr(fv_s, fv_m | H_d)}$$

where $fv_s$ denotes a feature vector which comes from the second representation when conditioned on Hp and from an unknown source when conditioned on $H_d$, $fv_m$ denotes a feature vector originating from the first representation.

The method may further include a check to see that the first and/or second and/or example and/or population representations or the expressions thereof, have the same discrete pieces of information. The use of the first and second consideration may only proceed if they do. Particularly in the case of the second consideration, a selection may be made of those population representations in the population representations available which have the same discrete pieces of information. The selection may be represented through a probability tree. Preferably the probability distribution based on the population representations uses only such selected population representations.

The using of the first consideration and the second consideration may provide a measure of the strength of link between the first representation and the second representation in the form of a likelihood ratio. The method may include providing an indication as to whether the first representation is likely to have the same source as the second representation. The indication as to whether the first representation is likely to have the same source as the second representation may be a yes or no indication and/or a quantified indication. The likelihood ratio may be the quotient of two probabilities. One of the probabilities may relate to the probability that the first and second representations came from the same source. One of the probabilities may be that the first and second representations came from different sources.

In the second aspect in particular, the following features, options and possibilities may apply to the manner in which the indication and probability distributions provide a measure of the strength of link between the first representation and the second representation, particularly in the context of one embodiment of the invention.

The probability for the numerator in the likelihood ratio may be stated as:—

$$\text{Num} = \Sigma\{Pr(d(fv_{s,c}, fv_{m,c})|fv_{s,d}, fv_{m,d}, H_p): \text{ for all } fv_{s,d} \text{ and } fv_{m,d} \text{ such that } fv_{s,d} = fv_{m,d}\}$$

where fv means feature vector, c means continuous, d means discrete, m means mark and s means suspect and therefore:

$fv_{m,c}$: continuous data of the feature vector from the mark $fv_{m,d}$: discrete data of the feature vector from the mark $fv_{s,c}$: discrete data of the feature vector from the suspect $fv_{s,d}$: discrete data of the feature vector from the suspect $d(fv_{s,c}, fv_{m,c})$ is the distance measured between the continuous data of the two feature vectors from the mark and the suspect $H_p$ is the prosecution hypothesis, that is the two feature vectors originate from the same source;

The probability for the numerator in the likelihood ratio may involve conditioning on $H_p$ (that is "the representations originate from the same source) and may further provide that $fv_{s,c}$ and $fv_{m,c}$ become information extracted from the same representation of the same source (for instance, the same finger of the same person). Preferably, when the values of the information pieces that are discrete in nature coincide the probabilities in the numerator, particularly in the right-hand-side of the above equation, are added up. Where some or all of the information pieces which are discrete in nature are present in the representation the index, $fv_{s,d} = fv_{m,d}$ in particular, of the summation is replaced by values of the information pieces that are not present. The summation symbol may be removed from the formula when all the information pieces that are discrete in nature are present in the representation.

The information pieces that are continuous in nature may be the length of one or more of the links and/or the direction and/or orientation. The distance may be obtained by subtracting term by term. The result may be a vector containing nine quantities. The result is preferably normalised. The sum of the squares of the distances from all the expressions, preferably vectors, may be considered to give a single value.

The probability for the denominator may be stated as:—

$$Den=\Sigma\{Pr(d(fv_{s,c},fv_{m,c})|fv_{s,d},fv_{m,d},H_d)Pr(fv_{m,d}|H_d): \text{ for all } fv_{s,d} \text{ and } fv_{m,d} \text{ such that } fv_{s,d}=fv_{m,d}\}$$

where fv means feature vector, c means continuous, d means discrete, m means mark and s means suspect and therefore:

$fv_{m,c}$: continuous data of the feature vector from the mark
$fv_{m,d}$: discrete data of the feature vector from the mark
$fv_{s,c}$: discrete data of the feature vector from the suspect
$fv_{s,d}$: discrete data of the feature vector from the suspect
$d(fv_{s,c}, fv_{m,c})$ is the distance measured between the continuous data of the two feature vectors from the mark and the suspect
$H_d$ is the defence hypothesis, that is the two feature vectors originate from different sources.

Preferably, when the values of the information that is discrete in nature coincide, the probabilities in the right-hand-side of this equation are added up. Preferably, when some or all of the information pieces that are discrete in nature are present in the representation, the index of the summation is replaced by values of the information pieces that are not present. The summation symbol is preferably removed when all the information pieces that are discrete in nature are present in the representation.

The information pieces that are continuous in nature may be the length of one or more of the links and/or the direction and/or orientation. The distance may be obtained by subtracting term by term. The result may be a vector containing nine quantities. The result is preferably normalised. The sum of the squares of the distances from all the expressions, preferably vectors, may be considered to give a single value.

In the second aspect in particular, the following features, options and possibilities may apply to the manner in which the indication and probability distributions provide a measure of the strength of link between the first representation and the second representation, particularly in the context of a further embodiment of the invention.

The probability for the numerator of the likelihood ratio may be stated as:

$$Num=Pr(d(fv_s,fv_m)|H_p)$$

where $d(fv_s, fv_m)$ is the distance measured between continuous data of the two feature vectors from the mark and suspect;
$H_p$ is the prosecution hypothesis, that is the two vectors originate from the same source.

The probability for the denominator may be stated as:

$$Den=Pr(d(fv_s,fv_m)|H_d)$$

where $H_d$ is the defence hypothesis, that is the two vectors originate from different sources.

The probability distributions are preferably a probability of occurrence distribution relative to the indication, preferably distance. The likelihood ratio is preferably given by the value of the probability distribution for the same source divided by the value of the probability distribution for the different sources at a particular indication or distance value.

Preferably variation due to distortion and/or clarity issues is incorporated in the calculation of the numerator of the likelihood ratio. Preferably the distance between the continuous information pieces is used, preferably in a feature vector.

In the third aspect in particular, the following features, options and possibilities may apply to the manner in which the indication and probability distributions provide a measure of the strength of match between the first representation and the second representation.

The probability for the numerator in the likelihood ratio may be stated as:

$$Num=\Sigma\{Pr(fv_{m,c}|fv_{s,c},fv_{s,d},fv_{m,d},H_p): \text{ for all } fv_{s,d} \text{ and } fv_{m,d} \text{ such that } fv_{s,d}=fv_{m,d}\}$$

where fv means feature vector, c means continuous, d means discrete, m means mark and s means suspect and therefore:

$fv_{m,c}$: continuous data of the feature vector from the mark
$fv_{m,d}$: discrete data of the feature vector from the mark
$fv_{s,c}$: discrete data of the feature vector from the suspect
$fv_{s,d}$: discrete data of the feature vector from the suspect
$d(fv_{s,c}, fv_{m,c})$ is the distance measured between the continuous data of the two feature vectors from the mark and the suspect
$H_p$ is the prosecution hypothesis, that is the two feature vectors originate from the same source;

The probability for the numerator in the likelihood ratio may involve conditioning on $H_p$ (that is "the representations originate from the same source) and may further provide that $fv_{s,c}$ and $fv_{m,c}$ become information extracted from the same representation of the same source (for instance, the same finger of the same person). Preferably, when the values of the information pieces that are discrete in nature coincide the probabilities in the numerator, particularly in the right-hand-side of the above equation, are added up. Where some or all of the information pieces that are discrete in nature are present in the representation, the index of the summation is replaced by values of the information pieces that are not present. The summation symbol may be removed from the formula when all the information pieces that are discrete in nature are present in the representation.

The probability for the denominator of the likelihood ratio may be stated as:

$$Den=\Sigma\{Pr(fv_{m,c}|fv_{m,d},H_d)Pr(fv_{m,d}|H_d): \text{ for all } fv_{s,d} \text{ and } fv_{m,d} \text{ such that } fv_{s,d}=fv_{m,d}\}$$

where fv means feature vector, c means continuous, d means discrete, m means mark and s means suspect and therefore:

$fv_{m,c}$: continuous data of the feature vector from the mark
$fv_{m,d}$: discrete data of the feature vector from the mark
$fv_{s,c}$: discrete data of the feature vector from the suspect
$fv_{s,d}$: discrete data of the feature vector from the suspect
$H_p$ is the prosecution hypothesis, that is the two feature vectors originate from the same source;

Preferably, when the values of the information that is discrete in nature coincide, the probabilities in the right-hand-side of this equation are added up. Preferably, when some or all of the information pieces that are discrete in nature are present in the representation, the index of the summation is replaced by values of the information pieces that are not present. The summation symbol is preferably removed when all the information pieces that are discrete in nature are present in the representation.

Preferably Bayesian networks are involved in the determination of the numerator and denominator of the likelihood ratio. Preferably the Bayesian network(s) for the numerator are estimated using dedicated databases containing different representations obtained from the same source, ideally under several distortion and/or clarity conditions. Preferably Bayesian network(s) for the denominator are estimated using dedicated databases containing representations from different sources, ideally different fingers and/or different people.

The method may include the use of Bayesian network(s) for providing information on general patterns within representations.

The calculation of the likelihood ratio may include consideration of the overall pattern of the representation and/or the region of the representation including the selected features. The region may be the front and/or rear and/or side and/or middle of the representation.

Preferably the method includes repeating the method steps in respect of selections of different plurality of features. Each repeat of the method may include selecting a plurality of features, preferably different in respect of at least one feature compared with other selections. Each repeat may include linking each feature to one or more of the other features in that plurality of features. Each repeat may include expressing information on the features and the link or links as a vector. Each repeat may include comparing the vector with the probability distribution. Preferably a series of feature and link data sets are expressed as vectors. Preferably the plurality of vectors of the first representation are taken and compared with the probability distribution. One or more of the vectors of the second representation may be formed according to the same method as the vectors for the first representation. Preferably the same number of features are involved in each repeat of the method steps for the first representations and/or second representations. Preferably the same number of features are involved for each representation compared according to the method. The representation may be considered using a plurality of features sets, preferably three features in each case. Ideally the feature set in each case is a triangle. The representation may be considered using at least 1 feature set, preferably at least 5 feature sets, more preferably at least 10 feature sets. Between 10 and 14 feature sets, ideally triangles, may be used. The representation may be considered using a plurality of feature sets in which one or more of the features are included in two or more feature sets. A feature may provide the apex of a plurality of triangles. Whilst the abovementioned numbers of feature sets may be used to process the representation, the method of the present invention may only be applied to some of those features sets. Preferably the number of features sets to which the first aspect of the invention is actually applied is between 5 and 10, ideally between 5 and 14.

Preferably a plurality of vectors of the first representation are compared with a plurality of probability distributions. The comparison may provide an indication of the likelihood of the first representation and second representation coming from the same source. The method may include providing an indication as to whether the first representation matches the second representation based upon the comparison of a plurality of vectors of the first representation with a plurality of vectors of the second representation. The indication as to whether the first representation matches the second representation may be a match's or does not match indication based upon the comparison of a plurality of vectors of the first representation with a plurality of vectors of the second representation. The indication, based upon the comparison of a plurality of vectors of the first representation with a plurality of vectors of the second representation, may provide a measure of the strength of a match, for instance a likelihood ratio.

Various embodiments of the invention will now be described, by way of example only, and with reference to the accompanying figures in which:—

FIG. 1 is a schematic overview of the stages, and within them steps, involved in the comparison of a print from an unknown source with a print from a known source;

FIG. 9 is a schematic illustration of the application of a series of triangle to part of a print according to a further approach to the data extraction;

FIG. 10 is a schematic illustration of the application of Delauney triangulation applied to the same part of a print as considered in FIG. 9;

BACKGROUND

A variety of situations call for the comparison of markers, including biometric markers. Such situations include a fingerprint, palm print or other such marking, whose source is known, being compared with a fingerprint, palm print or other such marking, whose source is unknown. Improvements in this process to increase speed and/or reliability of operation are desirable.

In the context of forensic science in particular, the consideration of the unknown source fingerprint may require the consideration of a partial print or print produced in less than ideal conditions. The pressure applied when making the mark, substrate and subsequent recovery process can all impact upon the amount and clarity of information available.

Process Overview

The overall process of the comparison is represented schematically in FIG. 1.

After the recovery of the fingerprint and its representation, which may be achieved in one or more of the conventional manners, a representation of the fingerprint is captured. This may be achieved by the consideration of a photograph or other representation of a fingerprint which has been recovered.

In the next stage, the representation is enhanced. The representation is processed to represent it as a purely black and white representation. Thus any colour or shading is removed. This makes subsequent steps easier to operate. The preferred approach is to use Gabor filters for this purpose, but other possibilities exist.

Figure 2A:
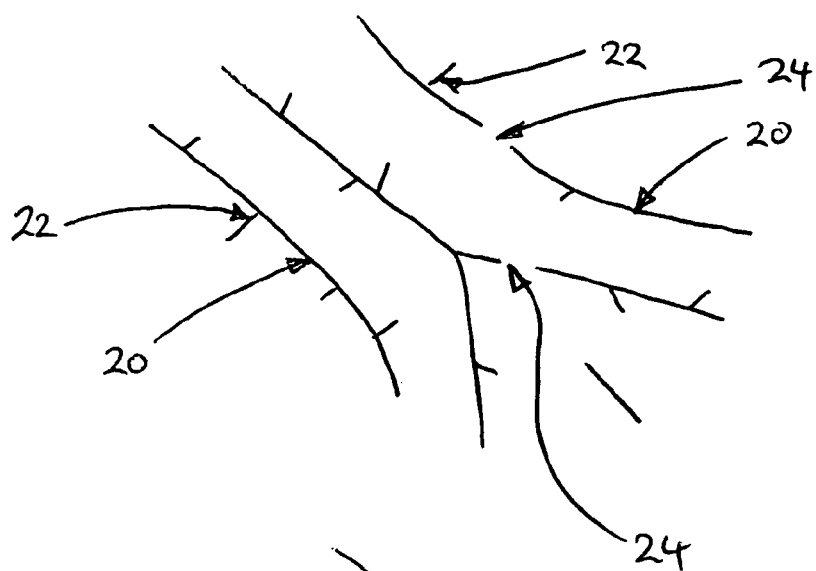
FIG. 2a is a schematic illustration of a part of a basic skeletonised print.
Figure 2B:
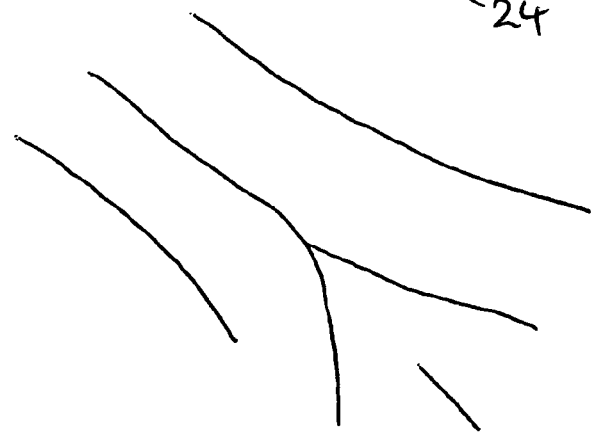
FIG. 2b is a schematic illustration of the print of FIG. 2a after cleaning and healing.

Following on from this part of the stage, the enhanced representation is converted into a format more readily processed. This skeletonisation includes a number of steps. The basic skeletonisation is readily achieved, for instance using a function within the Matlab software (available from The MathWorks Inc). A section of the basic skeleton achieved in this way is illustrated in FIG. 2a. The problem with this basic skeleton is that the ridges 20 often feature relatively short side ridges 22, "hairs", which complicate the pattern and are not a true representation of the fingerprint. Breaks 24 and other features may also be present which are not a true representation of the fingerprint. To counter these issues, the basic skeleton is subjected to a cleaning step and healing step as part of the skeletonisation. The operation of these steps are described in more detail below and gives a clean healed representation, FIG. 2b.

Once the enhanced representation of the recovered fingerprint has been processed to give a clean and healed representation, the data from it to be compared with the other print can be considered. To do this involves first the extraction of representation data which accurately reflects the configuration of the fingerprint present, but which is suitable for use in the comparison process. The extraction of representation data stage is explained in more detail below, but basically involves the use of one of a number of possible techniques.

Figure 3:
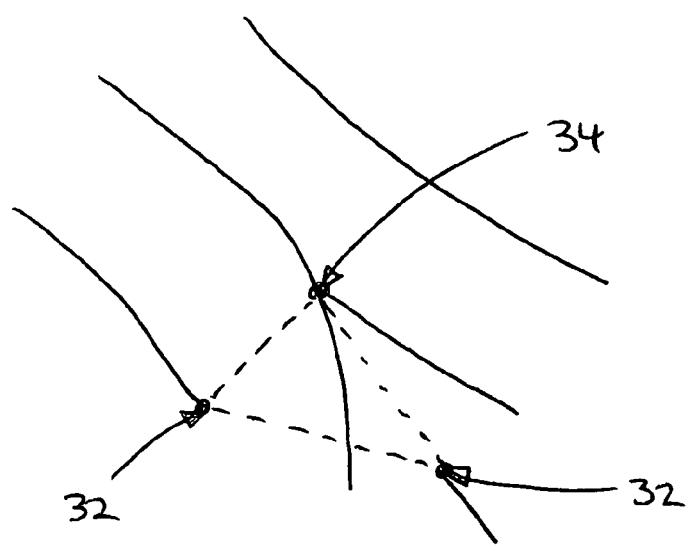
FIG. 3 is a schematic illustration of the generation of representation data for the print of FIG. 2b.

The first of the possible techniques, see FIG. 3, involves defining the position of features 30 (such as ridge ends 32 or bifurcation points 34), forming an array of triangles 36 with the features 30 defining the apex of those triangles 36 and using this and other representation data in the comparison stage.

In a second technique, developed by the applicant, the positions of features are defined and the positions of a group of these are considered to define a center. The center defines one apex of the triangles, with adjoining features defining the other apexes.

To facilitate the comparison stage, the representation data extracted is formatted before it is used in the comparison stage. This basically involves presenting the information characteristic of the triangles, quadrilaterals or other polygons being considered when the data is extracted in a format mathematically coded for use in the comparison stage. Further details of the format are described below.

Now that the fingerprint has been expressed as representation data, it can be compared with the other fingerprint(s). The comparison stage is based on different representation data being compared to that previously suggested. Additionally, in making the comparison, the technique goes further than indicating that the known and unknown source prints came from the same source or that they did not. Instead, an expression of the likelihood that they came from the same source is generated. In the preferred forms, one or both of the two different models (a data driven approach and a model driven approach) both described in more detail below are used.

Having provided an overview of the entire process, the stages and steps in them will now be discussed in more detail.

Cleaning and Healing Steps of the Skeletonisation Stage

Some existing attempts at interpreting the basic skeleton to give an improved version have been made.

Figure 4:
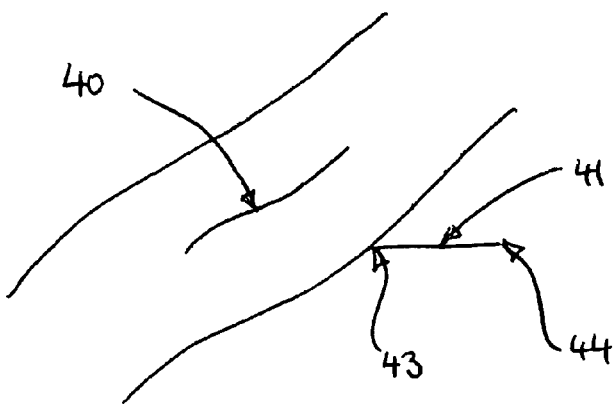
FIG. 4 is a schematic illustration of a part of a print potentially requiring cleaning.

In the situation illustrated in FIG. 4, the basic skeleton suggests that a ridge island 40 is present, as well as a short ridge 41 which as a result gives a bifurcation point 43 and ridge end 44.

The existing interpretation considers the length of the ridge island 40. If the length is equal to or greater than a predetermined length value then it is deemed a true ridge island and is left. If the length is less than the predetermined length then the ridge island is discarded. In a similar manner, the length from the bifurcation point 43 to the ridge end 44 is considered. Again if it is equal to or greater than the predetermined length it is kept as a ridge with its attendant features. If it is shorter than the predetermined length it is discarded. This approach is slow in terms of its processing as the length in all cases is measured by starting at the feature and then advancing pixel by pixel until the end is reached. The speed is a major issue as there are a lot of such features need to be considered within a print.

Figure 5:
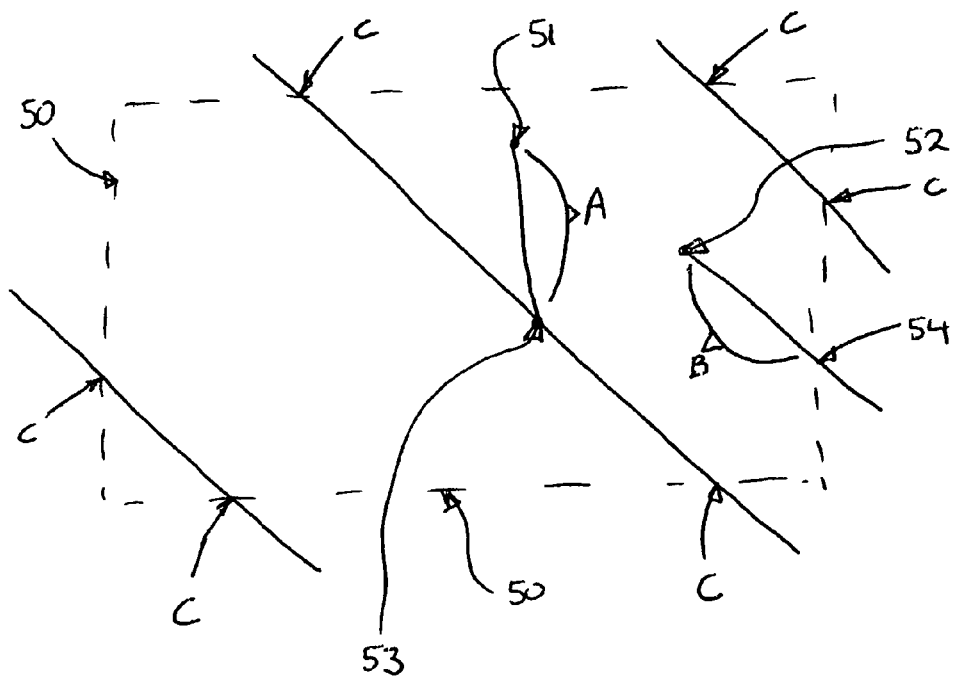
FIG. 5 is a schematic illustration of the neighborhood approach to cleaning according to the present invention.

The new approach now described has amongst its aims to provide a reliable, faster means for handling such a situation. Instead of advancing pixel by pixel, the new approach illustrated in FIG. 5 considers the print in a series of sections or neighborhoods. Thus a neighborhood definition, box 50, is applied to part of the print. Features within that neighborhood 50 are then quickly established by considering any pixel which is only connected to one other. This points to features 51 and 52 which represent ridge ends within the neighborhood 50. The start point for the data set forming a feature is then determined relative to the neighborhood 50. In the case of feature 51 this is the bifurcation feature 53. In the case of feature 52 this is the neighborhood boundary crossing 54. Thus feature 51 is part of data set A extending between feature 53 and feature 51. Feature 52 is a part of separate data set, data set B, extending between crossing 54 and feature 52. All data sets formed by a feature at both ends, with both features being within the neighborhood 50 are discarded as being too short to be true features. All data sets formed by a feature at one end and a crossing at the other are kept as far as the cleaning of that neighborhood is concerned. Thus feature 51 and its attendant data set are discarded (including the bifurcation feature 53) and feature 52 is kept by this cleaning for this neighborhood 50.

When further neighborhoods are considered, it may of course be that the feature 52 is itself part of a data set with the features both within that neighborhood, where upon it too will be discarded. If, however, it is the end of a ridge of significant length then for all neighborhoods considered its data set will start with the feature and end with a crossing and so be kept.

This approach can be used to address all ridge ends and attendant bifurcation features within the print to be cleaned.

Figure 6:
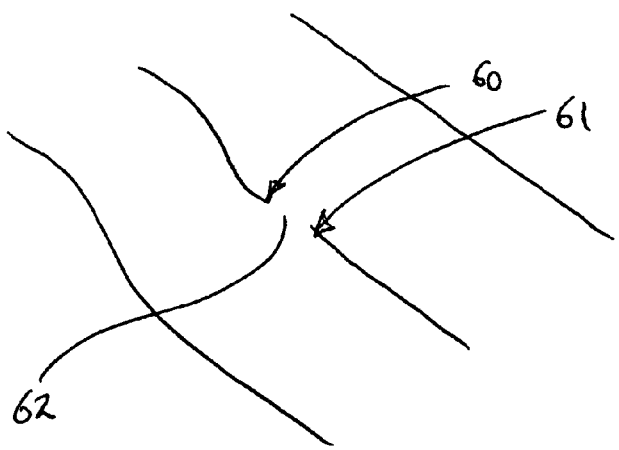
FIG. 6 is a schematic illustration of a part of a print potentially requiring healing.

As well as addressing "extra" data by cleaning, the present invention also addresses the type of situation illustrated in FIG. 6 where the basic skeleton shows a first ridge end 60 and a second 61, generally opposing one another, but with a gap 62 between them. Is this a single ridge which needs healing by adding data to join the two ends together? Or is this truly two ridge ends?

Not only is it desirable to address this type of situation, but it also must be done in a way which does not detract from the accuracy of the subsequent process, and in particular the generation of the representative data which follows. This is particularly important in the case where the "direction" is a part of the representative data generated, as proposed for the embodiment of the invention detailed below.

To ensure that the "direction" information is not impaired it must be accurately determined and maintained. The pixel by pixel approach of the type used above for cleaning, suggests taking a feature and then moved pixel by pixel away from it for a given length. A projected line between the feature and the pixel the right length away then gives the angle. Again the pixel by pixel approach is labourious and time consuming.

Figure 7:
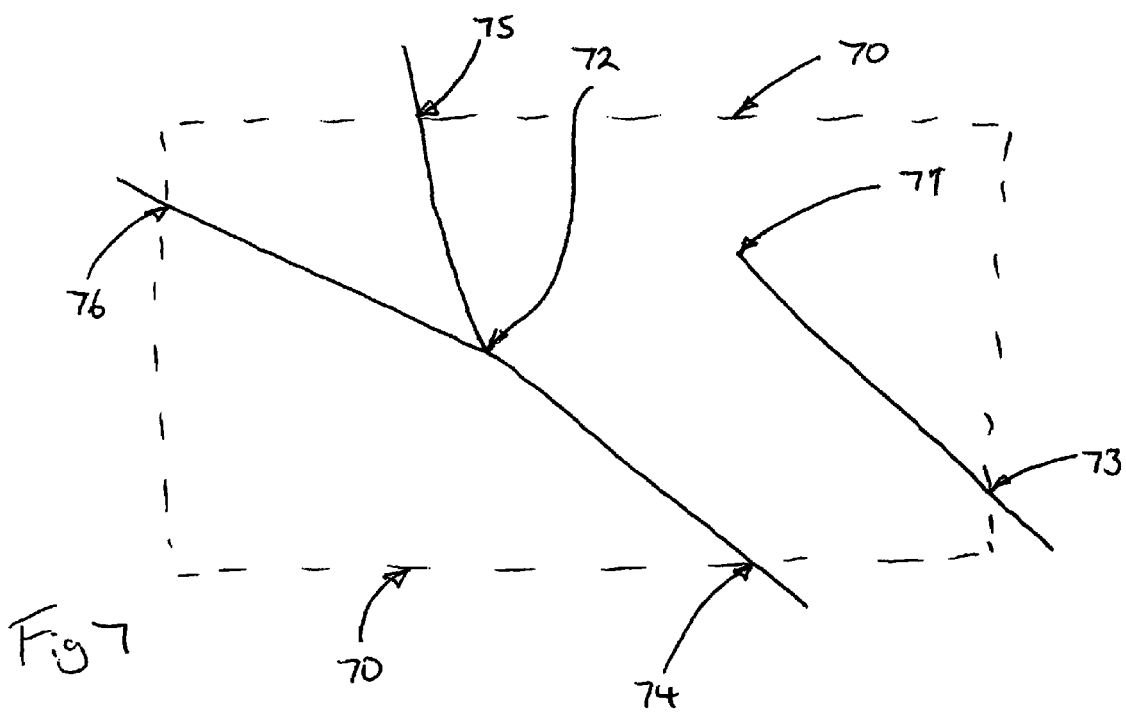
FIG. 7 is a schematic illustration of the neighborhood approach to direction determination, particularly useful in healing.

The approach of the present invention is illustrated in FIG. 7 and is again based on the neighborhood approach. A neighborhood 70 is defined relative to a part of the print. In this case, the part of the print includes a ridge end 71 and bifurcation 72. Also present are points where the ridges cross the boundaries of the neighborhood, crossings 73, 74, 75, 76. Again the crossings and features define a series of data sets. In this case, ridge end 71 and crossing 73 define data set W; bifurcation 72 and crossing 74 define data set X; bifurcation 72 and crossing 75 define data set Y; and bifurcation 72 and crossing 76 define data set Z.

The direction of data set W is defined by a line drawn between ridge end 71 and crossing 73. A similar determination can be made for the direction of the other data sets.

Once the directions for data sets have been obtained, the type of situation shown in FIG. 6 is addressed by considering the direction of the ridge ending in first ridge end 60 and the direction of the ridge ending in second ridge end 61. If the two directions are the same, within the bounds of a limited range, and the separation is small (for instance, the gap falls with the neighborhood) then the gap is healed and the two ridge ends 60, 61 disappear as features as far as further consideration is required. If the separation is too large and/or if the directions do not match, then no healing occurs and the ridge ends 60, 61 are accepted as genuine.

The approach taken in the present invention allows faster processing of the cleaning and healing stage, in a manner which is accurate and is not to the detriment of subsequent stages and steps.

Extraction of Representation Data

Preferably after the above mentioned processing, the necessary data from it to be compared with the other print can be extracted in a way which accurately reflects the configuration of the fingerprint present, but which is suitable for use in the comparison process.

Figure 8:
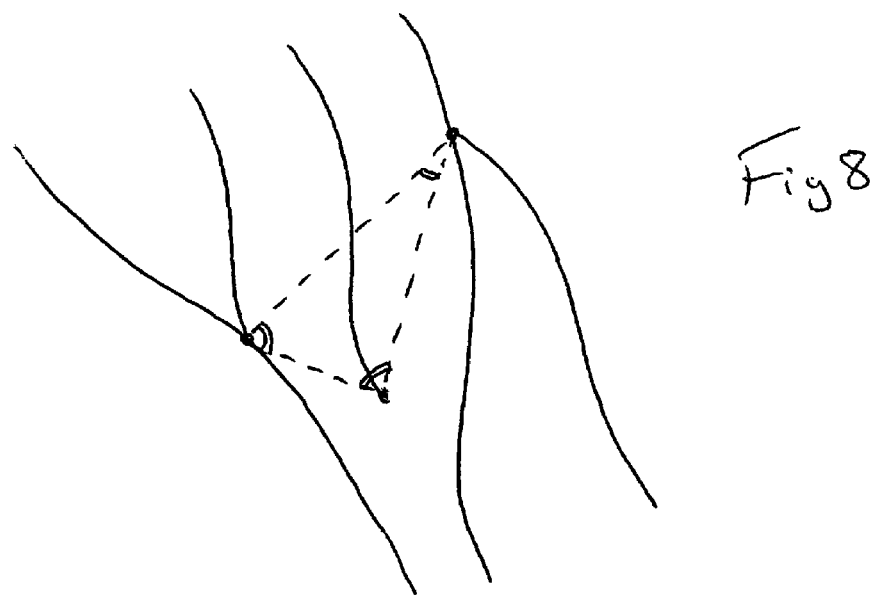
FIG. 8 is a schematic illustration of the application of a triangle to part of a print as part of the data extraction.

It is possible to fix coordinate axes to the representation and define the features/directions taken relative to that. However, this leads to problems when considering the impact of rotation and a high degree of interrelationship being present between data Instead of this approach, with reference to FIG. 8, one approach of the present invention will now be explained. Within the illustration, a first bifurcation feature 80, second 81 and ridge end 83 are present. These form nodes which are then joined to one another so that a triangle is formed. Extrapolation of this process to a larger number of minutia features gives a large number of triangles. A print can typically be represented by 50 to 70 such triangles. The Delaunay triangulation approach is preferred.

Whilst this one approach is suitable for use in the new mathematical coding of the information extracted set out below, the use of Delaunay triangulation does not extract the data in the most robust way.

In the alternative approach, developed by the applicant, an entirely new approach is taken. Referring to FIG. 9 a series of features 120a through 120l are identified within a representation 122. A number of approaches can be used to identify the features to include in a series. Firstly, it is possible to identify all features in the representation and join features together to form triangles (for instance, using Delauney triangulation). Having done so, one of the triangles is selected and this provides the first three features of the series. One of the adjoining triangles to the first triangle is then selected at random and this provides a further feature for the series. Another triangle adjoining the pair is then selected randomly and so on until the desired number of features are in the series. In a second approach, a feature is selected (for instance, at random) and all features within a given radius of the first feature are included in the series. The radius is gradually increased until the series includes the desired number of features.

Having established the series of features, the position of each of these features is considered and used to define a centre 124. Preferably, and as illustrated in this embodiment this is done by considering the X and Y position of each of the features and obtaining a mean for each. The mean X position and mean Y position define the centre 124 for that group of features 120a through 120l. Other approaches to the determination of the centre are perfectly useable. Instead of defining triangles with features at each apex, the new approach uses the centre 124 as one of the apexes for each of the triangles. The other two apexes for first triangle 126 are formed by features 120a and 120b. The next triangle 128 is formed by centre 124, feature 120b and 120c. Other triangles are formed in a similar way, preferably moving around the centre 124 in sequence. The set of triangles formed in this approach is unique, simple and easy to describe data set. The approach is more robust than the Delaunay triangulation described previously, particularly in relation to distortion. Furthermore, the improvement is achieved without massively increasing the amount of data that needs to be stored and/or the computing power needed to process it. For comparison purposes, FIG. 10 illustrates the Delaunay triangulation approach applied to the same set of features.

Either the first, Delaunay triangulation, based approach or the second, radial triangulation, approach extract data which is suitable for formatting according to the preferred approach of the present process.

Format of Representative Data

Having considered the print in one of the above mentioned ways to extract the representative data, the data must be suitably mathematically coded to allow the comparison process and here a different approach is taken to that considered before. The approach presents the extracted data in vector form, and so allows easy comparison between expressions of different representations.

Particularly with reference to the first approach, for a given triangle, a number of pieces of information are taken and used to form a feature vector. The information is: the type of the minutia feature each node represents (three pieces of information in total); the relative direction of the minutia features (three pieces of information in total); and the distances between the nodes (three pieces of information in total). Thus the feature vector is formed of nine pieces of information. The type of minutia can be either ridge end or bifurcation. The direction, a number between 0 and $2\pi$ radians, is calculated relative to the orientation, a number between 0 and $\pi$ radians, of the opposing segment of the triangle as reference and so the parameters of the triangle are independent from the image.

In particular the feature vector may be expressed as:

$$FV=[GP,Reg,\{T_1,A_1,D_{1,2},T_2,A_2,D_{2,3},T_3,A_3,D_{3,1}\}]$$

where

GP is the general pattern of the fingerprint;

Reg is the region of the fingerprint the triangle is in;

$T_1$ is the type of minutia 1;

$A_1$ is the direction of the minutia at location 1 relative to the direction of the opposing side of the triangle;

$D_{1,2}$ is the length of the triangle side between minutia 1 and minutia 2;

$T_2$ is the type of minutia 2;

$A_2$ is the direction of the minutia at location 2 relative to the direction of the opposing side of the triangle;

$D_{2,3}$ is the length of the triangle side between minutia 2 and minutia 3;

$T_3$ is the type of minutia 3;

$A_3$ is the direction of the minutia at location 3 relative to the direction of the opposing side of the triangle;

$D_{3,1}$ is the length of the triangle side between minutia 3 and minutia 1.

To avoid the same feature vector representing two symmetrical triangles, the features are recorded for all the triangles in the same order (either clockwise or anticlockwise). A rule of starting with the furthest feature to the left is used, but other such rules could be applied.

As each triangle considered is independent of the others and is also independent of the print image this addresses the problem of rotational issues in the comparison.

Advantageously the second data extraction approach described above is also suited to be mathematically coded using the vector format and so allow comparison with data extracted from other representations. The pieces of information used to form the feature vector in this case are: the general pattern of the fingerprint; the type of minutia; the direction of the minutia relative to the image; the radius of the minutia from the centre or centroid; the length of the polygon side between a minutia and the minutia next to it; the surface area of the triangle defined by the minutia, the minutia next to it and the centroid.

In particular the vector may be expressed as:

$$FV=[GP,\{T_1,A_1,R_1,L_{1,2},S_1\},\ldots,\{T_k,A_k,R_k,L_{k,k+1},S_k\},\ldots,\{T_N,A_N,R_N,L_{N,1},S_N\}]$$

where

GP is the general pattern of the fingerprint;

$T_k$ is the type of minutia i;

$A_k$ is the direction of minutia k relative to the image;

$L_{k,k+1}$ is the length of the polygon side between minutia k and minutia k+1;

$S_k$ is the surface area of the triangle defined by minutia k, k+1 and the centroid; and $R_k$ is the radius between the centroid and the minutia k When compared with the expression of the vector set out above in the context of the approach taken for the first data extraction approach, it should be noted that region of the fingerprint is no longer considered. The set of features can extend across region boundaries and so it is potentially not appropriate to consider one region in the vector. The region could still be considered, however, and the expression set out below is a suitable one in that context, with the region designated Reg and the other symbols having the meanings outlined above. Note a separate region is possible for each minutia.

$$FV=[GP,\{T_1,A_1,R_1,Reg_1,L_{1,2},S_1\},\ldots,\{T_k,A_k,R_k,Reg_k,L_{k,k+1},S_k\},\ldots,\{T_N,A_N,R_N,Reg_N,L_{N,1},S_N\}]$$

Using the types of format described above, it is possible to present the data extracted from the representations in a format particularly useful to the comparison stage.

Comparison Approaches

A number of different approaches to the comparison between a feature vector of the above mentioned type which represent the print from an unknown source with the a feature vector which represent the print from the known source are possible. A match/not match result may simply be stated. However, substantial benefits exist in making the comparison in such a way that a measure of the strength of a match can be stated.

Likelihood Ratio Approach

One general type of approach that can be taken, which allows the comparison to be expressed in terms of a measure of the strength of the match is through the use of a likelihood ratio.

The likelihood ratio is the quotient of two probabilities, one being that of two feature vectors conditioned on their being from the same source, the other two feature vectors being conditioned on their being from different sources. Feature vectors obtained according to the first data extraction approach and/or second extraction approach described above can be compared in this way, the differences being in the data represented in the feature vectors rather than in the comparison stage itself.

In each case, therefore, the approach can be derived from the expression:

$$LR = \frac{Pr(fv_s, fv_m | Hp)}{Pr(fv_s, fv_m | Hd)}$$

Where the feature vector fv contains the information extracted from the representation and formatted. The addition of the subscript s to this abbreviation denotes that a feature vector comes from the suspect, and the addition of the subscript m denotes that a feature vector originates from the crime. The symbol $fv_s$ then denotes a feature vector from the known source or suspect, and $fv_m$ denoted the feature vector originated from an unknown source from the crime scene. For modelling purposes it is useful to classify a feature vector into discrete quantities (which may include general pattern, region, type, and other data) and continuous quantities (which may include the distances between minutiae, relative directions and other data).

The preferred forms for the quotient in the context of the first approach and second approach are discussed in more detail below in the context of their use in the data driven approach to the comparison stage.

Within the general concept of a likelihood ratio approach, a number of ways of implementing such an approach exist. One such approach which allows the comparison to be expressed in terms of a measure of the strength of the match is through the use of a data driven approach.

Data Driven Approach

In general terms, the data driven approach involves the consideration of a quotient defined by a numerator which considers the variation in the data which is extracted from different representations of the same fingerprint and by a denominator which considers the variation in the data which is extracted from representations of different fingerprints. The output of the quotient is a likelihood ratio.

In order to quantify the likelihood ratio, the feature vector for the first representation, the crime scene, and the feature vector for the second representation, the suspect are obtained, as described above. The difference between the two vectors is effectively the distance between the two vectors. Once the distance has been obtained it is compared with two different probability distributions obtained from two different databases.

In the first instance, the probability distribution for these distances is estimated from a database of prints taken from the same finger. A large number of pairings of prints are taken from the database and the distance between them is obtained. This involves a similar approach to that described above. Each of the prints has data extracted from it and that data is formatted as a feature vector. The differences between the two feature vectors give the distance between that pairing. Repeating this process for a large number of pairings gives a range of distances with different frequencies of occurrence. A probability distribution reflecting the variation between prints of the same figure is thus obtained.

Ideally, the database would be obtained from a number of prints taken from the same finger of the suspect. However, the approach can still be applied where the prints are taken from the same finger, but that finger is someone's other than the suspect. This database needs to reflect how a print (more particularly the resulting triangles and their respective feature vectors) from the same finger changes with pressure and substrate. This database is formed from a significant number of sets of information, each set being a large number of prints taken from the same finger under the full range of conditions encountered in practice. The database is populated by the identification, by an operator, of corresponding triangles in several applications of the same finger. Alternatively, a smaller set of prints can be processed as described above, distortion functions can then be calculated. The prefer method is thin plate splines, but other methods exist. The distortion function can then be applied to other prints to simulate further sets of data.

In the second instance, the probability distribution for these distances is estimated from a database of prints taken from different fingers. Again a large number of pairings of prints are taken from the database and the distance between them obtained. The extraction of data, formatting as a feature vector, calculation of the distance using the two feature vectors and determination of the distribution is performed in the same way, but uses the different database.

This different database needs to reflect how a print (more particularly the resulting triangles and their respective feature vectors) from a number of different fingers varies between fingers and, potentially, with various pressures and substrates involved. Again, the database is populated by the identification, by an operator, of triangles in the various representations obtained from the different fingers of different persons.

Having established the manner in which the databases and probability distributions are obtained, the comparison of a crime scene print against a suspect print is considered further.

The numerator may thus be thought of as considering a first representation obtained from a crime scene or an item linked to a crime, against a second representation from a suspect through an approach involving:

taking and/or generating a number of example representations of the second representation;
considering the example representations as a number of triangles;
considering the value of the feature vector for a given triangle in respect of each of the example representations;
obtaining the feature vector value of the first representation;
forming a probability distribution of the frequency of the cross-differences of different feature vector values for a given triangle between example representations;
comparing the difference of the feature vector value of the first representation and the feature vector value of the second representation with the probability distribution.

The denominator may thus be thought of as considering the second representation obtained from a suspect against a series of representations taken from a population through an approach involving:

taking or generating a number of example representations of representations taken from a population;
considering the example representations as a number of triangles;
considering the values of the feature vectors in respect of each of the example representations;
forming a probability distribution of the frequency of differences between the feature vector of the first representation and the different feature vector values from the example representations;
obtaining the feature vector value of the second representation;
comparing the difference between the feature vector value of the first representation and the feature vector value of the second representation with the probability distribution.

Applying the data driven approach, and in the context of the first data extraction approach (Delaunay triangulation), and after some algebraic operations, a probability for the numerator of the likelihood ratio is computed using the following formula:—

$$\text{Num} = \Sigma \{Pr(d(fv_{s,c}, fv_{m,c})|fv_{s,d}, fv_{m,d}, H_p): \text{ for all } fv_{s,d} \text{ and } fv_{m,d} \text{ such that } fv_{s,d} = fv_{m,d}\}$$

where
fv means feature vector, c means continuous, d means discrete, m means mark and s means suspect and therefore:
$fv_{m,c}$: continuous data of the feature vector from the mark
$fv_{m,d}$: discrete data of the feature vector from the mark
$fv_{s,c}$: discrete data of the feature vector from the suspect
$fv_{s,d}$: discrete data of the feature vector from the suspect
$d(fv_{s,c}, fv_{m,c})$ is the distance measured between the continuous data of the two feature vectors from the mark and the suspect
$H_p$ is the prosecution hypothesis, that is the two feature vectors originate from the same source.

Notice that, conditioning on $H_p$, suggests $fv_{s,c}$ and $fv_{m,c}$ become measurements extracted from the same finger of the same person. The subscript in the summation symbol means that the probabilities in the right-hand-side of equation are added up for all the cases where the values of the discrete quantities of the features vectors coincide. In some occasions some or all of the discrete variables are present in the fingermark. For these cases the index of the summation is replaced by values of the quantities that are not present. The summation symbol is removed when all discrete quantities are present in the fingermark.

The expression $d(fv_{s,c}, fv_{m,c})$ denotes a distance between the continuous quantities of the feature vectors for the prints. The continuous quantities in a feature vector are the length of the triangle sides and minutia direction relative to the opposite side of the triangle. There are a number of distance measures that can be used but the distance measure describe below is preferred. This distance measure is computed by first subtracting term by term. The result is a vector containing nine quantities. This is then normalised to ensure that the length and angle are given equal weighting. By taking the sum of the squares of the distances from all the feature vectors considered in this way a single value is obtained.

In such a case, and after some algebraic operations, a probability for the denominator of the likelihood ratio is computed using the following formula, $$Den = \Sigma \{Pr(d(fv_{s,c}, fv_{m,c})|fv_{s,d}, fv_{m,d}, H_d) Pr(fv_{m,d}|H_d) : \text{for all } fv_{s,d} \text{ and } fv_{m,d} \text{ such that } fv_{s,d} = fv_{m,d}\}$$

where fv means feature vector, c means continuous, d means discrete, m means mark and s means suspect. and therefore:

$fv_{m,c}$: continuous data of the feature vector from the mark
$fv_{m,d}$: discrete data of the feature vector from the mark
$fv_{s,c}$: discrete data of the feature vector from the suspect
$fv_{s,d}$: discrete data of the feature vector from the suspect
$d(fv_{s,c}, fv_{m,c})$ is the distance measured between the continuous data of the two feature vectors from the mark and the suspect $H_d$ is the defence hypothesis, that is the two feature vectors originate from different sources.

Several distance measures exist but the one described above is preferred. The subscript in the summation symbol means that the probabilities in the right-hand-side of this equation are added up for all the cases where the values of the discrete quantities of the features vectors coincide. In some occasions some or all of the discrete variables are present in the fingermark. For these cases the index of the summation is replaced by values of the quantities that are not present. The summation symbol is removed when all discrete quantities are present in the fingermark.

Conditioning on $H_d$, that is "the prints originated from different sources", the features vectors come from different fingers of different people. The probability distribution for distances $d(fv_{s,c}, fv_{m,c})$ can be estimated from a reference database of fingerprints. This database needs to reflect how much variability there is in respect of all prints (again more particularly the resulting triangles and their feature vectors) between different sources. This database can readily be formed by taking existing records of different source fingerprints and analysing them in the above mentioned way.

The second factor $Pr(fv_{m,d}|H_d)$ is a probability distribution of discrete variables including general pattern. A probability distribution for general pattern was computed based on frequencies compiled by the FBI for the National Crime Information Center in 1993. These data can be found on http://home.att.net/~dermatoglyphics/mfre/. A probability distribution for the remaining discrete variables can be estimated from a reference database using a number of methods. A probability tree is preferred because it can more efficiently code the asymmetry of this distribution, for example, the number of regions depends on the general pattern.

Again applying the data driven approach, and in the context of the second data extraction approach (radial triangulation), a probability for the numerator of the likelihood ratio is computed using the following formula:

$$Num = Pr(d(fv_s, fv_m)|H_p)$$

where $d(fv_s, fv_m)$ is the distance measured between discrete and continuous data of the two feature vectors from the mark and suspect;

$H_p$ is the prosecution hypothesis, that is the two vectors originate from the same source.

The probability for the numerator is computed using the following formula:

$$Den = Pr(d(fv_s, fv_m)|H_d)$$

where $H_d$ is the defence hypothesis, that is the two vectors originate from different sources.

In each case, similar approaches to those detailed above can be used to generate the relevant probability distributions.

In the second approach, it is possible to measure the distance between feature vectors in the above described manner of the first data extraction approach in respect of each orientation of the polygon in the mark and suspect representations. However, the large number of minutia which may now be being considered in a feature vector (for instance 12) would mean that there are very many rotations (for instance 12 rotations) of the feature vector which must be considered, compared with the more practical three of the first approach. The use of a greater number of minutia is desirable as this increases the discriminating power of the process. Investigations to date suggest that by the time 12 minutia are being considered, there is little or no overlap between the within finger distribution and between finger distributions illustrated in FIG. 11.

In a modification, therefore, a feature vector is first considered against another feature vector in terms of only part of the information it contains. In particular, the information apart from the minutia direction can be compared. In the comparison, the data set included in one of the vectors is fixed in orientation and the data set included in the other vector with which it is being compared is rotated. If the data set relates to three minutia then three rotations would be considered, if it related to twelve then twelve rotations would be used. The extent of the fit at each position is considered and the best fit rotation obtained. This leads to the association of minutiae pairs across both feature vectors.

Figure 13:
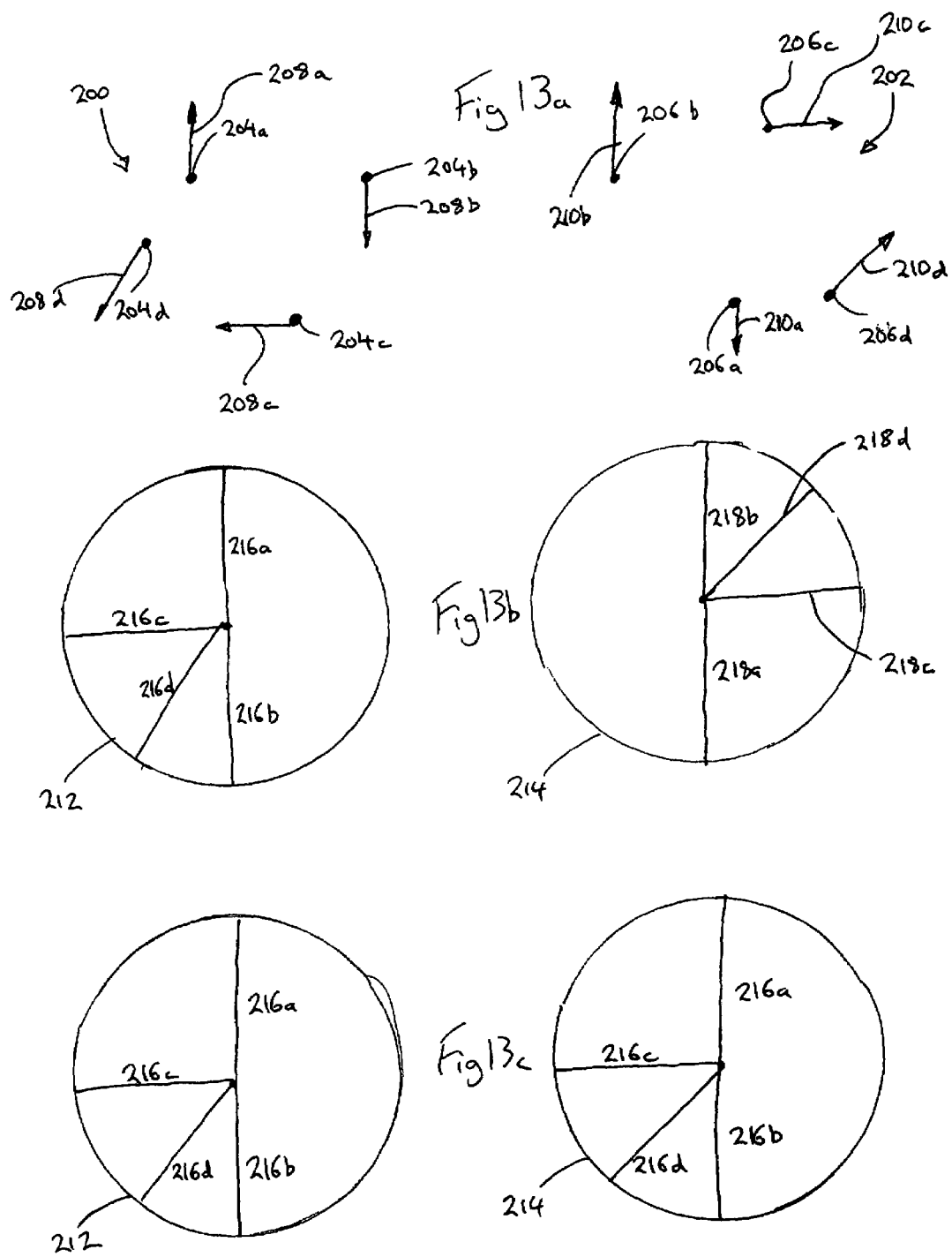
FIG. 13a illustrates minutia and direction information from a mark and a suspect.
FIG. 13b illustrates the presentation of the direction information in a format for comparison.
FIG. 13c illustrates the information of FIG. 13b being compared.

In respect of the best fit rotation, in each case, the process then goes on to compare the remaining data in each set, the minutia direction. To achieve this, the minutiae directions are made independent of the orientation of the print on the image. The approach taken on direction is described with reference to FIG. 13a through 13c. In FIG. 13a, a mark set of minutia 200 and a suspect set of minutia 202 are being considered against one another. Each set is formed of four minutia, 204a, 204b, 204c, 204d and 206a, 206b, 206c, 206d respectively. The allocation of the minutia reference numerals reflects the suggested best match between the two sets arising from the consideration of the minutia type, length of the polygon sides between minutia, surface of the polygon defined by the minutia and centroid. Each of the minutia has an associated direction 208a, 208b, 208c, 208d and 210a, 210b, 210c, 210d respectively. For the mark set 200 and the suspect set 202, a circle 212, 214 of radius one is taken. To the mark circle 212 is added a radius 216 for each of the minutia directions, see FIG. 13b. To the suspect circle 214 is added a radius 218 from each of the minutia directions, FIG. 13b. Rotation of one of the circles relative to the other allows the orientation of the minutia to be brought into agreement, according to the set of the pairs of minutiae that were determined before, FIG. 13c, and allows the extent of the match in terms of the minutiae directions for each pair of minutiae to be considered. In the illustrated case there is extensive agreement between the two circles and hence between the two marks in respect of the data being considered.

In effect, the match between the polygons is being considered in terms of the minutia type, distance between minutia, radius between the minutia and the centroid, surface area of the triangle defined between the minutia and the centroid and minutia direction. All of these considerations serve to compliment one another in the comparison process. One or more may be omitted, however, and a practical comparison be carried out.

The comparison provides a distance which can be considered against the two distributions in the manner previously described with reference to FIGS. 11 and 12 below. Various means can be used for computing the distance, including algorithms (such as Euclidean, Pearson, Manhattan etc) or using neural networks.

Assessing a Comparison Using the Data Driven Approaches

Having extracted the data, formatted it in feature vector form and compared two feature vectors to obtain the distance between them, that distance is compared with the two probability distributions obtained from the two databases to give the assessment of match between the first and second representation.

Figure 11:
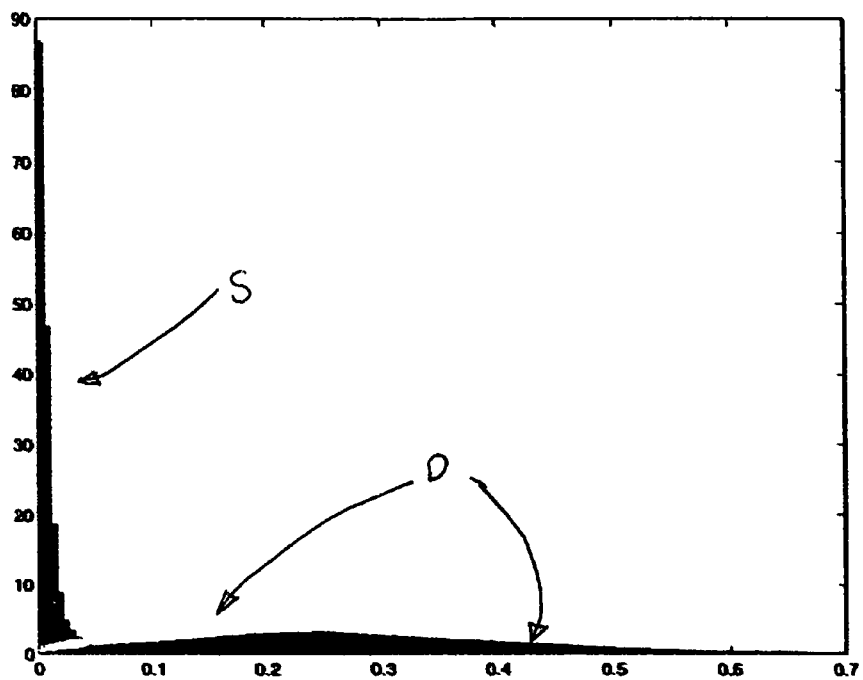
FIG. 11 is a representation of a probability distribution for variation in prints from the same finger and a probability distribution for variation in prints between different fingers.

In FIG. 11, the distribution for prints from the same finger is shown, S, and shows good correspondence between examples apart from in cases of extreme distortion or lack of clarity. Almost the entire distribution is close to the vertical axis. Also shown is the distribution for prints from the fingers of different individuals, D. This shows a significant spread from a low number of extremely different cases, to an average of very different and with a number of little different cases. The distribution is spread widely across the horizontal axis.

Figure 12:
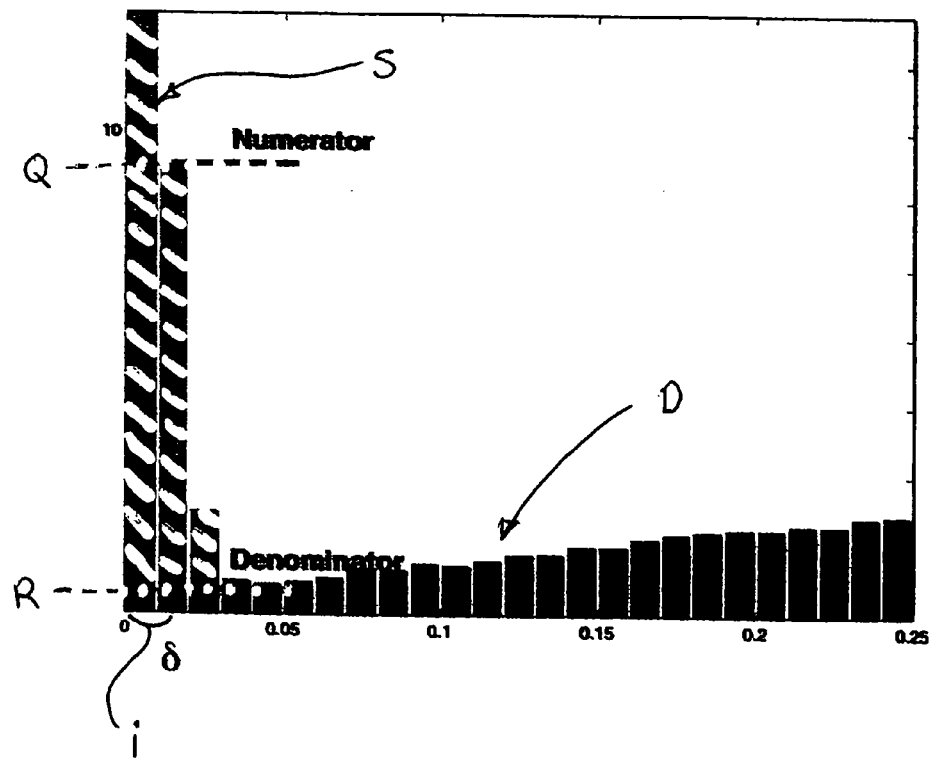
FIG. 12 shows the distributions of FIG. 9 in use to provide a likelihood ratio for a match between known and unknown prints.

In FIG. 12, these distributions are considered against a distance I obtained from the comparison of an unknown source (for instance, crime scene) and known source (for instance, suspect) fingerprint in the manner described above. At this distance, I, the values (Q and R respectively) of the distributions S and D can be taken, dotted lines. The likelihood ratio of a match between the two prints is then Q/R. In the illustrated case, distance I is small and so there is a strong probability of a match. If distance I were great then the value of Q would fall dramatically and the likelihood ratio would fall dramatically as a result. The later approach to the distance measure issue is advantageous as it achieves the result in a single iteration, provides a continuous output and does not require the determination of thresholds.

The databases used to define the two probability distributions preferably reflect the number of minutia being considered in the process. Thus different databases are used where three minutia are being considered, than where twelve minutia are being considered. The manner in which the databases are generated and applied are generally speaking the same, variations in the way the distances are calculated are possible without changing the operation of the database set up and use. Equally, it is possible to form the various databases from a common set of data, but with that data being considered using a different number of minutia to form the database specific to that number of minutia.

The databases may be generated in advance in respect of the numbers of minutia expected to be considered in practice, for instance 3 to 12, with the relevant databases being used for the number of minutia being considered in a particular case, for instance 6. Pre-generation of the databases avoids any delays whilst the databases are generated. However, it is also possible to have to hand the basic data which can be used to generate the databases and generate the database required in a specific case in response to the number of minutia which need to be considered. Thus, a mark may be best considered using six minutia and the desire to consider this mark would lead to the database being generated for six minutia from the basic database of fingerprint representations by considering that using six minutia. The data set size which needs to be stored would be reduced as a result.

In certain circumstances it is also possible to generate the probability distributions in advance. This can occur, for instance, where the within finger variation is being considered and that is considered on the basis of a single (or several) finger(s) not from the suspect. In the case of the model based approach, discussed below, it is possible to generate and store both probability distributions in advance.

Significant benefit from this overall approach arise due to: incorporating distortion and clarity in the numerator of the likelihood ratio; introducing the distance measure between the quantities in the feature vector; the use of probability distribution distances between features vectors from the same source and its estimation from a dedicated sets of data of replicates of the same finger; the use of probability distribution for the distances between print of different sources and its estimation from a reference database containing prints from different sources.

The description presented here exemplifies the use of this methodology, but the methodology is readily adapted for use in other forms. For instance, the Delauney triangulation form could be extended to cover more than three minutiae.

Model Based Approach

Within the general concept of a likelihood ratio approach, another approach which allows the comparison to be expressed in terms of a measure of the strength of the match is through the use of a model based approach.

In such an approach, and after some algebraic operations a probability for the numerator of the likelihood ratio is computed using the following formula, $$\text{Num} = \Sigma \{Pr(fv_{m,c}|fv_{s,c},fv_{s,d},fv_{m,d},H_p): \text{for all } fv_{s,d} \text{ and } fv_{m,d} \text{ such that } fv_{s,d}=fv_{m,d}\}$$

where fv means feature vector, c means continuous, d means discrete, m means mark and s means suspect. and therefore:

$fv_{m,c}$: continuous data of the feature vector from the mark $fv_{m,d}$: discrete data of the feature vector from the mark $fv_{s,c}$: discrete data of the feature vector from the suspect $fv_{s,d}$: discrete data of the feature vector from the suspect $d(fv_{s,c}, fv_{m,c})$ is the distance measured between the continuous data of the two feature vectors from the mark and the suspect $H_p$ is the prosecution hypothesis, that is the two feature vectors originate from the same source;

As noted before, the continuous quantities, when conditioning on $fv_{s,c}$ and $fv_{m,c}$ become measurement of the same finger and person. The subscript in the summation symbol means that the probabilities in the right-hand-side of the equation are added up for all the cases where the values of the discrete quantities of the features vectors coincide. In some occasions some or all of the discrete variables are present in the fingermark. For these cases the index of the summation is replaced by values of the quantities that are not present. The summation symbol is removed when all discrete quantities are present in the fingermark.

The probability distribution for $fv_{s,c}$ is computed using a Bayesian network estimated from a database of prints taken from the same finger as described above. Many algorithms exists for estimating the graph and conditional probabilities in a Bayesian networks, but the preferred algorithms are the NPC algorithm for estimating acyclic directed graph, see Steck H., Hofmann, R., and Tresp, V. (1999). *Concept for the PRONEL Learning Algorithm*, Siemens A G, Munich and/or the EM-algorithm, S. L. Lauritzen (1995). The EM algorithm for graphical association models with missing data. *Computational Statistics & Data Analysis*, 19:191-201. for estimating the conditional probability distributions. The contents of both documents, particularly in relation to the algorithms they describe are incorporated herein by reference.

Further explanation of the use of Bayesian networks follows below.

The manner in which the first representation is considered against the second representation, through the use of a probability distribution, is as described above, save for the probability distribution being computed using the Bayesian network approach rather than a series of example representations of the second representation.

Using this approach and after some algebraic operations a probability for the denominator of the likelihood ratio is computed using the following formula, $$Den = \Sigma \{Pr(fv_{m,c}|fv_{m,d},H_d)Pr(fv_{m,d}|H_d): \text{for all } fv_{s,d} \text{ and } fv_{m,d} \text{ such that } fv_{s,d} = fv_{m,d}\}$$

where fv means feature vector, c means continuous, d means discrete, m means mark and s means suspect. and therefore:

$fv_{m,c}$: continuous data of the feature vector from the mark $fv_{m,d}$: discrete data of the feature vector from the mark $fv_{s,c}$: discrete data of the feature vector from the suspect $fv_{s,d}$: discrete data of the feature vector from the suspect $d(fv_{s,c}, fv_{m,c})$ is the distance measured between the continuous data of the two feature vectors from the mark and the suspect $H_d$ is the defence hypothesis, that is the two feature vectors originate from different sources.

The subscript in the summation symbol means that the probabilities in the right-hand-side of equation are added up for all the cases where the values of the discrete quantities of the features vectors coincide. In some occasions some or all of the discrete variables are present in the fingermark. For these cases the index of the summation is replaced by values of the quantities that are not present. The summation symbol is removed when all discrete quantities are present in the fingermark.

The probability distribution in the first factor of the right hand side of equation above is computed with a Bayesian network estimated from a database of feature vectors extracted from different sources. There are many methods for estimating Bayesian networks as noted above, but the preferred methods are the NPC-algorithm of Steck et al., 1999 for estimating an acyclic directed graph and/or the EM-algorithm of Lauritzen, 1995 for the conditional probability distributions. There is a Bayesian network for each combination of values of the discrete variables. The second factor $Pr(fv_{m,d}|H_d)$ is estimated in the same manner as described for the data-driven approach above.

Again the approach to considering the second representation against the population representations is as detailed above, save for the probability distribution being computed using the Bayesian network approach.

Assessing a Comparison Using the Model Based Approach

Given a feature vector from know source $fv_s$ and from an unknown source $fv_m$, the numerator is given by the equation and is calculated with a Bayesian network dedicated for modelling distortion. The second factor in the denominator is calculated in the same manner as with the data-driven approach. The first factor is computed using Bayesian networks. A Bayesian network is selected for the combination of values of $f_{m,d}$ which is then use for computing a probability $Pr(fv_{m,c}|fv_{m,d},H_d)$. This process is repeated for all values in the index of the summation. The likelihood ratio is then obtained by computing the quotient of the numerator over the denominator.

Significant benefit from this approach arise due to: using Bayesian networks for computing the numerators and denominator of the likelihood ratio; estimating Bayesian networks for the numerator from dedicated databases containing replicates of the same finger and under several distortion conditions; estimating Bayesian networks for the denominator from dedicated databases containing prints from different fingers and people.

The description above is an example of using Bayesian networks for calculating the likelihood ratio, but the invention is not limited to it. Another example is estimating one Bayesian network per general pattern. This invention can also be used for more than three minutiae by defining suitable feature vectors.

Figure 14:
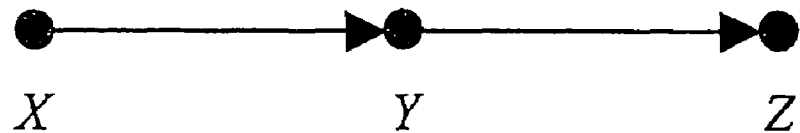
FIG. 14 is a Bayesian network representation.

As mentioned above, in order to estimate the numerator and denominator in the above likelihood ratio consideration, it is possible to use a Bayesian network representation to specify a probability distribution. For brevity of explaination the concept of a Bayesian network is presented through an example. A Bayesian network is an acyclic directed graph together with conditional probabilities associated to the nodes of the graph. Each node in the graph represents a quantity and the arrows represent dependencies between the quantities. FIG. 14 displays an acyclic graph of a Bayesian network representation for the quantities X, Y and Z. This graph contains the information that the joint distribution of X, Y an d Z is given by the equation $$p(x,y,z) = p(x)p(y|x)p(z|y) \text{ for all } x,y,z$$

and so the joint distribution is completely specified within the graph and the conditional probability distributions $\{p(x):$ for all $x\}$, $\{p(y/x)$ for all x and $y\}$ and $\{p(z/y)$ for all z and $y\}$. A detailed presentation on Bayesian networks can be found in a number of books, such as Cowell, R. G., Dawid A. P., Lauritzen S. L. and Spiegelhalter D. J. (1999) "Probabilistic networks and expert systems".

The invention is:

1. A method of comparing a first representation of an identifier with a second representation of an identifier, the method including:

providing an expression of the first representation;
providing an expression of the second representation;
providing a plurality of example representations of the second representation;
providing an expression of each of the plurality of example representations;

providing a probability distribution based on the expressions of the plurality of example representations of the second representations;

considering the expression of the first representation against the probability distribution for the example representations, to provide a first consideration;

providing a plurality of population representations from different origins;

providing an expression of each of the plurality of population representations;

providing a probability distribution based on the expressions of the plurality of population representations;

considering the expression of the second representation against the probability distribution for the population examples, to provide a second consideration;

using the first consideration and second consideration to provide a measure of comparison between the first representation and the second representation.

2. A method according to claim 1 in which the considering of the expression of the first representation against the probability distribution for the example representations, to provide a first consideration, includes considering the expression of the first representation and the expression of the second representation.

3. A method according to claim 1 in which the consideration is of the distance between the expression of the first representation and the expression of the second representation.

4. A method according to claim 1 in which the considering of the expression of the expression of the second representation against the probability distribution for the population examples, to provide a second consideration, includes considering the expression of the second representation and the expression of the first representation.

5. A method according to claim 4 in which the consideration is of the distance between the expression of the second representation and the expression of the first representation.

6. A method according to claim 1 in which the considering of the expression of the first representation against a probability distribution, for different example representations of the second representation, forms the numerator in the use of the first consideration and second consideration.

7. A method according to claim 6 in which the considering of the expression involves finding the frequency for that expression value in the probability distribution.

8. A method according to claim 1 in which the probability distribution based on the expressions of the example representations is arrived at by estimating from a database of example representations of an identifier taken from the same source.

9. A method according to claim 1 in which the probability distribution based on the expressions of the population examples are arrived at by estimating from a database of population representations of an identifier from different sources.

10. A method according to claim 1 in which the first consideration and second consideration are used to evaluate a hypothesis, the hypothesis including as the first consideration, that the first representation and the second representation are from the same source.

11. A method according to claim 1 in which the first consideration and second consideration are used to evaluate a hypothesis, the hypothesis including as the second consideration, that the first representation and the second representation are from different sources.

12. A method according to claim 1 in which the use of the first consideration and second consideration is to evaluate a prosecution hypothesis and a defence hypothesis.

13. A method according to claim 1 in which the use of the first consideration and second consideration is to evaluate:

$$LR = \frac{Pr(fv_s, fv_m | H_p)}{Pr(fv_s, fv_m | H_d)}$$

where $fv_s$ denotes a feature vector which comes from the second representation when conditioned on Hp and from an unknown source when conditioned on $H_d$, $fv_m$ denotes a feature vector originating from the first representation.

14. A method according to claim 1 in which the use of the first consideration and the second consideration is to provide a measure of the strength of link between the first representation and the second representation in the form of a likelihood ratio.

15. A method according to claim 14 in which an indication as to whether the first representation is likely to have the same source as the second representation is provided.

16. A method according to claim 1 in which the measure of comparison is a likelihood ratio and the probability for the numerator in the likelihood ratio is stated as:—

Num=$\Sigma\{Pr(d(fv_{s,c},fv_{m,c})|fv_{s,d},fv_{m,d},H_p)$: for all $fv_{s,d}$ and $fv_{m,d}$ such that $fv_{s,d}=fv_{m,d}\}$ where fv means feature vector, c means continuous, d means discrete, m means mark and s means suspect and therefore:

$fv_{m,c}$: continuous data of the feature vector from the mark $fv_{m,d}$: discrete data of the feature vector from the mark $fv_{s,c}$: discrete data of the feature vector from the suspect $fv_{s,d}$: discrete data of the feature vector from the suspect $d(fv_{s,c}, fv_{m,c})$ is the distance measured between the continuous data of the two feature vectors from the mark and the suspect $H_p$ is the prosecution hypothesis, that is the two feature vectors originate from the same source.

17. A method according to claim 1 in which the measure of comparison is a likelihood ratio and the probability for the denominator of the likelihood ratio is stated as:—

Den=$\Sigma\{Pr(d(fv_{s,c},fv_{m,c})|fv_{s,d},fv_{m,d},H_d)Pr(fv_{m,d}|H_d)$: for all $fv_{s,d}$ and $fv_{m,d}$ such that $fv_{s,d}=fv_{m,d}\}$ where fv means feature vector, c means continuous, d means discrete, m means mark and s means suspect and therefore:

$fv_{m,c}$: continuous data of the feature vector from the mark $fv_{m,d}$: discrete data of the feature vector from the mark $fv_{s,c}$: discrete data of the feature vector from the suspect $fv_{s,d}$: discrete data of the feature vector from the suspect $d(fv_{s,c}, fv_{m,c})$ is the distance measured between the continuous data of the two feature vectors from the mark and the suspect $H_d$ is the defence hypothesis, that is the two feature vectors originate from different sources.

18. A method according to claim 1 in which the indication and probability distributions provide a measure of the strength of link between the first representation and the second representation, and the probability for the numerator of the likelihood ratio is stated as:

Num=$Pr(d(fv_s,fv_m)|H_p)$ where
- $d(fv_s, fv_m)$ is the distance measured between continuous data of the two feature vectors from the mark and suspect;
- $H_p$ is the prosecution hypothesis, that is the two vectors originate from the same source.

19. A method according to claim 1 in which the indication and probability distributions provide a measure of the strength of link between the first representation and the second representation, and the probability for the denominator of the likelihood ratio is stated as:

$$Den = Pr(d(fv_s, fv_m)|H_d)$$

where
- $H_d$ is the defence hypothesis, that is the two vectors originate from different sources.

* * * * *

UNITED STATES PATENT AND TRADEMARK OFFICE
CERTIFICATE OF CORRECTION

| | | |
|---|---|---|
| PATENT NO. | : 7,369,700 B2 | Page 1 of 1 |
| APPLICATION NO. | : 11/083579 | |
| DATED | : May 6, 2008 | |
| INVENTOR(S) | : Neumann et al. | |

It is certified that error appears in the above-identified patent and that said Letters Patent is hereby corrected as shown below:

Please insert the following paragraph beginning at Column 1 following the title with the following paragraph:

Col. 1, line 3: -- This invention was made with United States government support under Contract No. DAAAD05/03-C-0038 awarded by the Technical Support Working Group, ATTN; ISF Subgroup, PO Box 16224, Arlington, Virginia 22215, USA. The United States government has certain rights in this invention. --

Signed and Sealed this

Twenty-sixth Day of August, 2008

JON W. DUDAS
*Director of the United States Patent and Trademark Office*